(12) United States Patent
Fujiwara et al.

(10) Patent No.: US 10,696,177 B2
(45) Date of Patent: Jun. 30, 2020

(54) VEHICLE CONTROL METHOD AND CONTROL DEVICE

(71) Applicant: NISSAN MOTOR CO., LTD., Yokohama-shi, Kanagawa (JP)

(72) Inventors: Kengo Fujiwara, Kanagawa (JP); Akira Sawada, Kanagawa (JP); Sho Ohno, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/317,854

(22) PCT Filed: Jul. 29, 2016

(86) PCT No.: PCT/JP2016/072406
§ 371 (c)(1),
(2) Date: Jan. 15, 2019

(87) PCT Pub. No.: WO2018/020679
PCT Pub. Date: Feb. 1, 2018

(65) Prior Publication Data
US 2019/0337398 A1 Nov. 7, 2019

(51) Int. Cl.
*B60L 15/20* (2006.01)
*B60L 7/08* (2006.01)
*B60L 15/08* (2006.01)

(52) U.S. Cl.
CPC ............ *B60L 15/2009* (2013.01); *B60L 7/08* (2013.01); *B60L 15/08* (2013.01); *B60L 15/20* (2013.01);
(Continued)

(58) Field of Classification Search
CPC ........ B60L 15/2009; B60L 7/08; B60L 15/08; B60L 2240/12; B60L 2240/14; B60L 2240/421; B60L 2250/28
See application file for complete search history.

(56) References Cited

U.S. PATENT DOCUMENTS 5,920,160 A * 7/1999 Yamada .................. B60K 6/26
318/9
8,958,970 B2 * 2/2015 Matsunaga ............ B60K 6/485
104/121
(Continued)

FOREIGN PATENT DOCUMENTS

JP H09-233878 A 9/1997
JP 2997278 B2 1/2000
(Continued)

*Primary Examiner* — Russell Frejd
(74) *Attorney, Agent, or Firm* — Faegre Drinker Biddle & Reath LLP

(57) ABSTRACT

A vehicle control device for decelerating by the regenerative braking of a motor connected to a drive shaft of a drive wheel calculates a torque command value for suppressing a vibration component of the drive shaft by feeding back a torsional angular velocity of the drive shaft to a desired torque that determines the power of the motor and controls the operation of the motor on the basis of the torque command value. The control device estimates a dead zone section, in which the torque of the motor in the vehicle is not transmitted to the drive shaft, on the basis of the desired torque and limits the torque command value in the case where the vehicle is in the dead zone section.

6 Claims, 19 Drawing Sheets

(52) U.S. Cl.
CPC ....... *B60L 2240/12* (2013.01); *B60L 2240/14* (2013.01); *B60L 2240/421* (2013.01); *B60L 2250/28* (2013.01); *B60L 2270/145* (2013.01); *Y02T 10/7275* (2013.01)

(56) References Cited

U.S. PATENT DOCUMENTS

| | | | |
|---|---|---|---|
| 9,315,114 B2 * | 4/2016 | Oono | ........................ H02P 6/10 |
| 2015/0112532 A1 | 4/2015 | Oono et al. | |
| 2015/0127202 A1 * | 5/2015 | Itou | ........................ B60L 15/20 |
| | | | 701/22 |
| 2015/0372628 A1 | 12/2015 | Oono | |
| 2016/0159225 A1 * | 6/2016 | Nakatsu | ................... B60L 7/26 |
| | | | 701/71 |

FOREIGN PATENT DOCUMENTS

| | | | |
|---|---|---|---|
| JP | 2002-152916 A | 5/2002 | |
| WO | WO 2013/157313 A1 | 10/2013 | |
| WO | WO-2013/157315 A1 | 10/2013 | |
| WO | WO-2014/115626 A1 | 7/2014 | |
| WO | WO-2016/021059 A1 | 2/2016 | |

\* cited by examiner

VEHICLE CONTROL METHOD AND CONTROL DEVICE

TECHNICAL FIELD

The present invention relates to a vehicle control method and control device for deceleration by the regenerative braking of a motor connected to a drive shaft of drive wheels.

BACKGROUND ART

JP2002-152916A describes a vehicle adapted to reduce the torsional vibration of a drive shaft attributable to a change in motor torque by feeding back, as the torsional velocity of the drive shaft, a difference between a value obtained by converting the motor rotation speed of the vehicle into the rotation speed of a drive wheel and the average rotation speed of the drive wheel.

SUMMARY OF INVENTION

The foregoing vehicle driving force transmission system is configured to transmit the power of the motor to the drive wheels through the intermediary of a reduction gear. Hence, the acceleration of the vehicle from a decelerated state or the deceleration thereof from an accelerated state goes through a dead zone section, in which motor torque is not transmitted to the drive shaft due to a gear backlash.

According to the technique in which the difference between the value obtained by converting the motor rotation speed into the drive wheel rotation speed and the average rotation speed of the drive wheel is fed back as described above, the motor torque increases as the change rate of the motor rotation speed increases. As a result, in the case where the vehicle accelerates or decelerates, the motor torque increases in the dead zone section, thus leading to a possibility of the occurrence of a noise or a vibration at a timing when gears mesh with each other.

The present invention has been made with a view toward overcoming the drawbacks described above, and an object of the invention is to provide a vehicle control method and a vehicle control device which suppress a noise or a vibration caused by overpassing a dead zone section of a driving force transmission system while at the same time reducing the torsional vibration of a drive shaft.

According to an aspect of this invention, a vehicle control method for decelerating by the regenerative braking of a motor connected to a drive shaft of a drive wheel includes a calculation step of calculating a torque command value for suppressing a vibration component of the drive shaft by feeding back a torsional angular velocity of the drive shaft to a desired torque that determines the power of the motor. The vehicle control method includes an estimation step of estimating a dead zone section, in which the torque of the motor in the vehicle is not transmitted to the drive shaft, on the basis of the desired torque, a limitation step of limiting the torque command value in the case where the vehicle is estimated to be in the dead zone section and a control step of controlling the operation of the motor on the basis of the torque command value.

DESCRIPTION OF EMBODIMENTS

The following will describe the embodiments of the present invention with reference to the accompanying drawings.

First Embodiment

Figure 1:
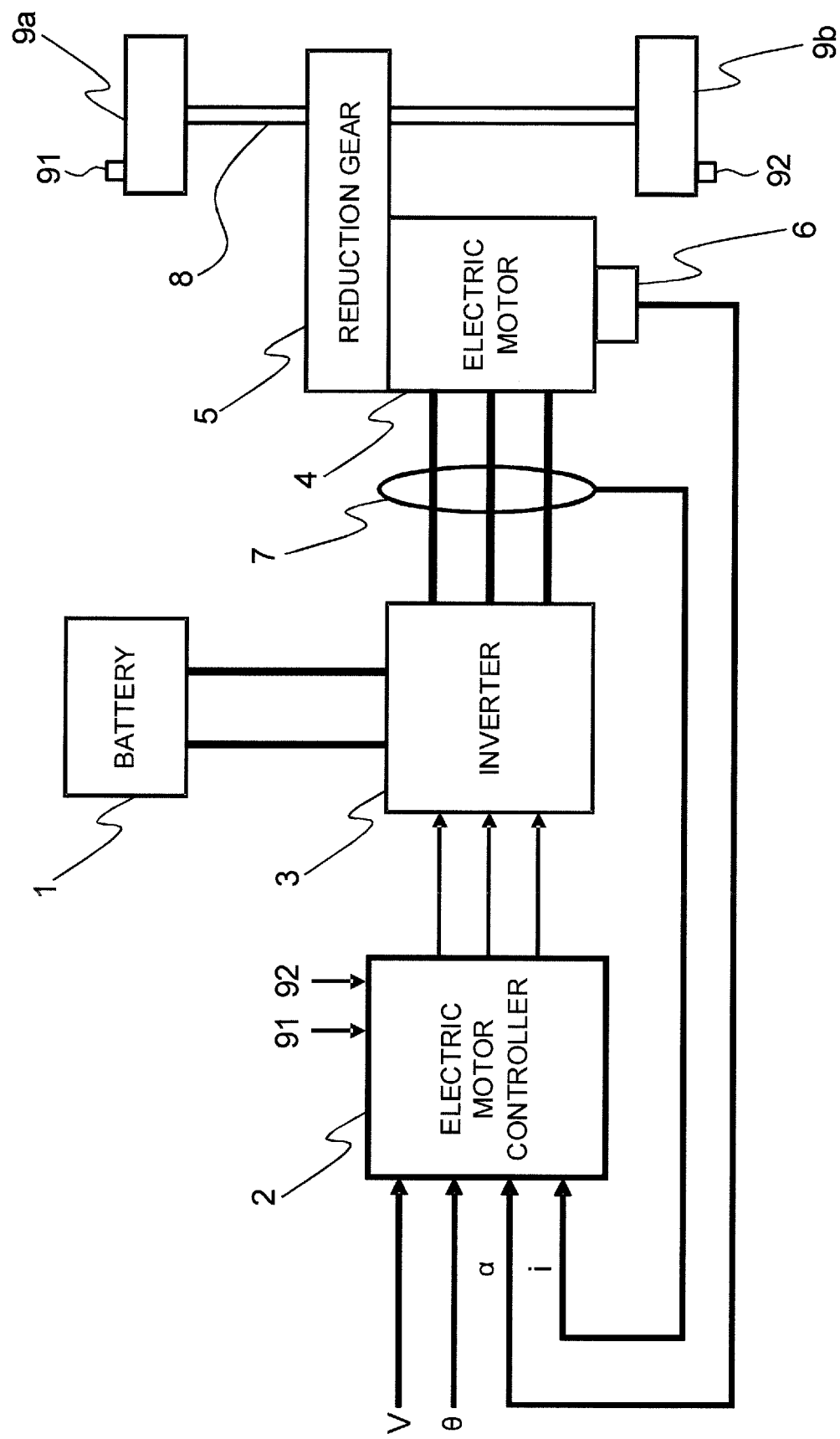
FIG. 1 is a configuration diagram illustrating an example of the configuration of a vehicle in a first embodiment of the present invention.

FIG. 1 is a block diagram illustrating major constituent components of an electric vehicle provided with a vehicle control device according to a first embodiment of the present invention.

The vehicle according to the present embodiment has an electric motor 4 connected to a drive shaft 8 of drive wheels 9a and 9b through a reduction gear 5, and decelerates by a regenerative braking force of the electric motor 4 under the control of an electric motor controller 2, which is the control device. Hereinafter, the reduction gear 5 and the drive shaft 8 up to the drive wheels 9a and 9b from the electric motor 4 will be referred to as the driving force transmission system.

The vehicle according to the present embodiment includes an electric vehicle that has electric power supplied from a battery 1, which is a power source, to the electric motor 4 through the intermediary of an inverter 3, and uses the power of the electric motor 4 generated by the electric power thereby to drive the vehicle. The electric vehicle means an automobile that has the electric motor 4 as a part or the whole of the drive source of the vehicle and is capable of traveling by the driving force of the electric motor 4, and includes a hybrid car and a fuel-cell car in addition to an electric car.

Signals that indicate a vehicle state, including a vehicle speed V, an accelerator position (accelerator opening degree) θ, a rotor phase α of the electric motor 4, and currents iu, iv and iw of the electric motor 4 are input to the electric motor controller 2, and the input signals are converted into digital signals. Based on the converted signals, the electric motor controller 2 generates PWM signals for controlling the electric motor 4 and generates drive signals of the inverter 3 according to the generated PWM signals.

The inverter 3 has, for example, two switching elements (e.g. power semiconductor elements, such as IGBTs or MOS-FETs) for each phase. The inverter 3 turns on/off a switching element in response to a drive signal thereby to convert a DC current supplied from the battery 1 to an AC current and supplies a desired current to the electric motor 4.

The electric motor (three-phase AC motor) 4 generates a driving force from the AC current supplied from the inverter 3 and transmits the driving force to the left and right drive wheels 9a, 9b through the intermediary of the reduction gear 5 and the drive shaft 8. Further, the electric motor 4 generates a regenerative driving force when rotated by the rotational forces of the drive wheels 9a, 9b while the vehicle is traveling. At this time, the inverter 3 converts the AC current generated when the electric motor 4 is in a regenerative operation mode into a DC current and supplies the DC current to the battery 1. Thus, the motion energy of the vehicle is recovered as electrical energy.

A rotation sensor 6 is, for example, a resolver or an encoder, and detects the rotor phase α of the electric motor 4.

A current sensor 7 detects the three-phase AC currents iu, iv and iw passing through the electric motor 4. However, the sum of the three-phase AC currents iu, iv and iw is zero, so that the currents of any two phases may be detected and the current of the remaining one phase may be determined by calculation.

Wheel rotation sensors 91 and 92 are provided on the drive wheels 9a and 9b, respectively. The wheel rotation sensors 91 and 92 detect the rotation angles (rad) of the drive wheels.

Figure 2:
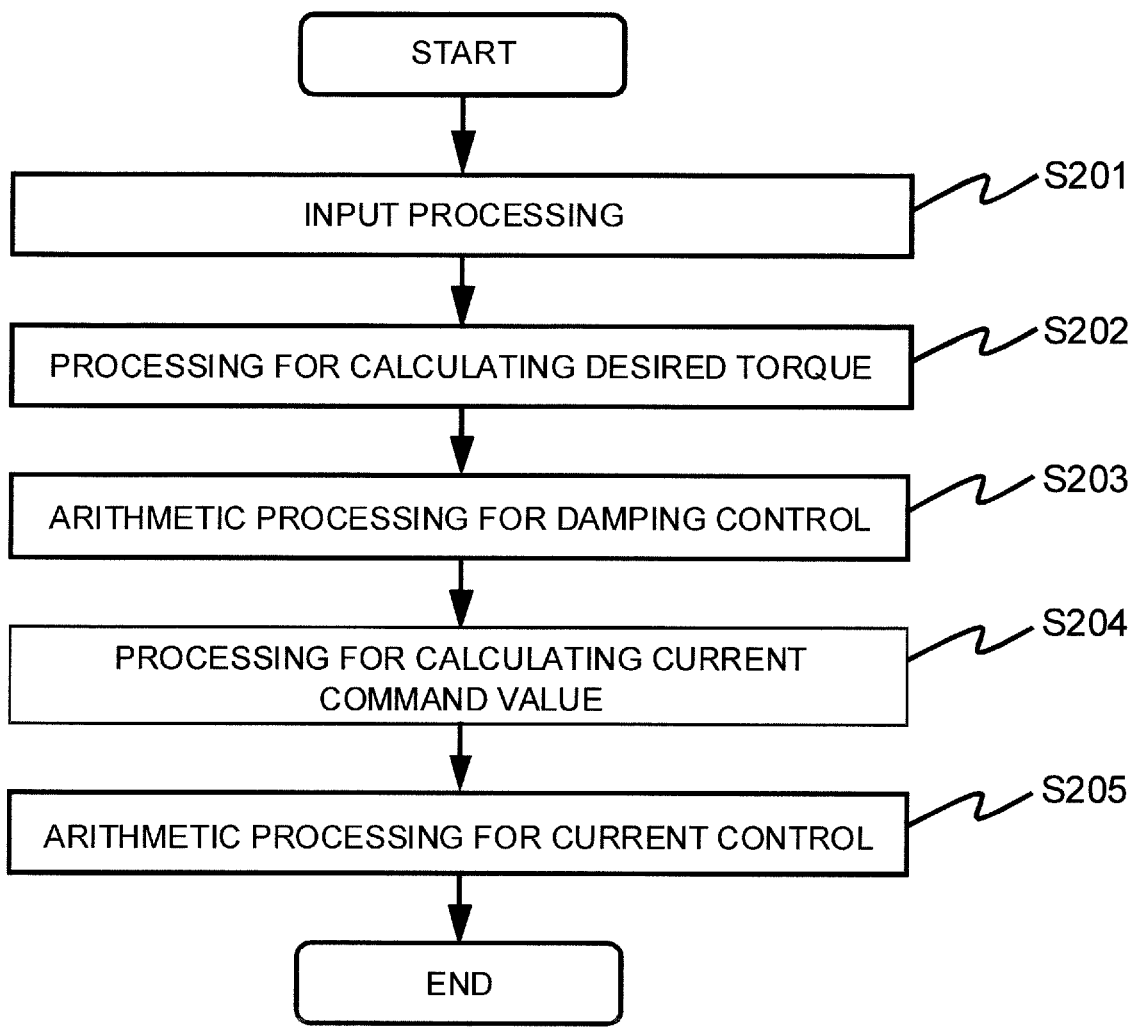
FIG. 2 is a flowchart illustrating an example of a processing procedure related to a control method for controlling the vehicle.

FIG. 2 is a flowchart illustrating the processing procedure of the control method carried out by the electric motor controller 2.

In step S201, the electric motor controller 2 acquires signals that indicate vehicle states. According to the present embodiment, as the signals that indicate the vehicle states, a vehicle speed V (km/h), an accelerator position θ (%), the rotor phase α (rad) of the electric motor 4, the rotation speed Nm (rpm) of the electric motor 4, an angular velocity ω (rad/s) of a rotor, the currents iu, iv and iw of the electric motor 4, the drive wheel rotational angular velocity ωw, and a DC voltage value Vdc (V) of the battery 1 are input to the electric motor controller 2.

The vehicle speed V (km/h) is acquired through communication from a vehicle speed sensor, which is not illustrated, or a brake controller or other controllers, which are not illustrated. Alternatively, a value obtained by multiplying the motor rotational angular velocity ωm, which is a mechanical angular velocity of the electric motor 4, by a tire dynamic radius R is divided by the gear ratio of a final gear thereby to determine the vehicle speed v (m/s). Then, the determined vehicle speed v (m/s) may be multiplied by 3600/1000 to perform unit conversion thereby to determine the vehicle speed V (km/h).

The accelerator position θ (%) is acquired from an accelerator position sensor, which is not illustrated. Alternatively, the accelerator position θ (%) is acquired through communication from a vehicle controller or other controller, which is not illustrated.

The rotor phase α (rad) of the electric motor 4 is acquired from the rotation sensor 6. Regarding the rotation speed Nm (rpm) of the electric motor 4, the angular velocity ω (electric angle) of the rotor is divided by the number of pole pairs of the electric motor 4 to determine the motor rotational angular velocity ωm (rad/s), and the motor rotational angular velocity ωm is multiplied by 60/(2π) to determine the rotation speed Nm (rpm) of the electric motor 4. The angular velocity ω (rad/s) of the rotor is determined by differentiating the rotor phase α.

The currents iu, iv and iw (A) of the electric motor 4 are acquired from the current sensor 7.

The drive wheel rotational angular velocity ωw (rad/s) is calculated by differentiating the average value of the values detected by the wheel rotation sensors 91 and 92.

The DC voltage value Vdc (V) is determined using a supply voltage value transmitted from a voltage sensor (not illustrated) provided on a DC power supply line between the battery 1 and the inverter 3, or a battery controller, which is not illustrated.

In step S202, the electric motor controller 2 sets a desired torque command value Tmt* indicating the desired torque (the desired value of torque) of the electric motor 4. In other words, the electric motor controller 2 calculates the desired torque value that provides the basis. The electric motor controller 2 in the present embodiment sets the desired torque command value Tmt* on the basis of the accelerator position θ and the vehicle speed V, which have been input in step S201, by referring to a pre-established accelerator position vs torque table. The accelerator position vs torque table will be discussed later.

In step S203, the electric motor controller 2 calculates the desired torque command value Tmt* and the motor rotational angular velocity ωm, and sets a final torque command value Tmf* that will suppress the vibration of the driving force transmission system (such as the torsional vibration of the drive shaft 8) without sacrificing the response of the drive shaft torque. The method for setting the final torque command value Tmf* will be described in detail later.

In step S204, the electric motor controller 2 determines a d-axis current desired value id* and a q-axis current desired value iq* on the basis of the final torque command value Tmf* and the motor rotational angular velocity corn, which have been set in step S203, and the DC voltage value Vdc.

In step S205, the electric motor controller 2 carries out current control for matching a d-axis current id and a q-axis current iq with the d-axis current desired value id* and the q-axis current desired value iq*, which have been determined in step S204.

For example, the electric motor controller 2 first determines the d-axis current id and the q-axis current iq on the basis of the three-phase AC current values iu, iv and iw, which have been input in step S201, and the rotor phase α of the electric motor 4. Subsequently, the electric motor controller 2 calculates d-axis and q-axis voltage command values vd and vq from the differences between d-axis and q-axis current command values id* and iq* and d-axis and q-axis currents id and iq.

Next, the electric motor controller 2 determines three-phase AC voltage command values vu, vv and vw from the d-axis and q-axis voltage command values vd and vq and the rotor phase α of the electric motor 4. Then, the electric motor controller 2 determines PWM signals tu (%), tv (%) and tw (%) from the three-phase AC voltage command values vu, vv and vw and the DC voltage value Vdc, which have been determined.

The switching elements of the inverter 3 are opened or closed in response to the PWM signals tu, tv and tw determined as described above, thus driving the electric motor 4 at a desired torque indicated by a torque command value.

Figure 3:
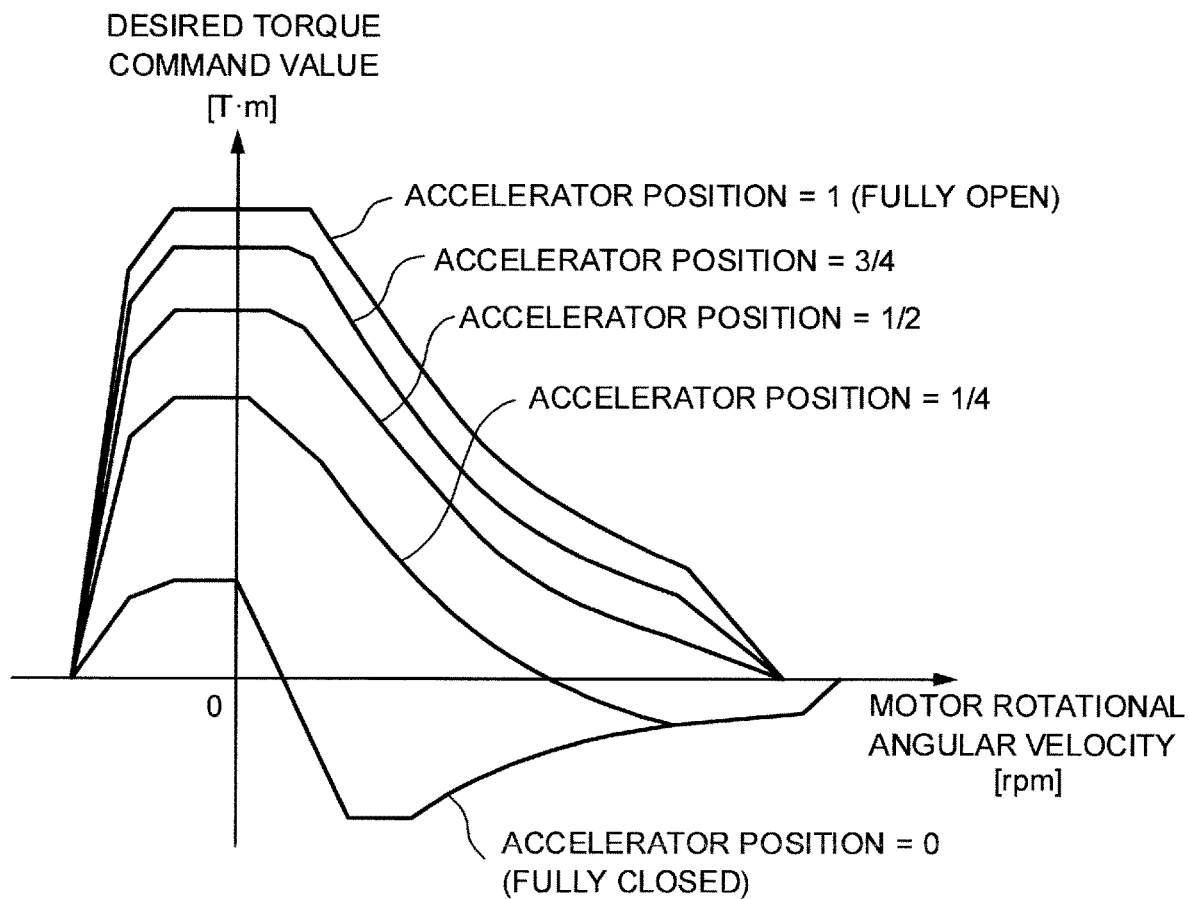
FIG. 3 is a conceptual diagram illustrating a relationship between the opening degree of an accelerator pedal provided in the vehicle and the torque of a motor.

FIG. 3 is a conceptual diagram illustrating an example of the accelerator position vs torque table used for setting the desired torque command value Tmt*.

As illustrated in FIG. 3, the relationship between the motor rotational angular velocity ωm and the desired torque command value Tmt* is set for each accelerator position. In the present embodiment, the desired torque command value Tmt* increases toward a negative (minus) side as the accelerator position approaches zero, so that the vehicle is decelerated by the regenerative braking force of the electric motor 4. Therefore, when a driver releases the accelerator pedal, the vehicle decelerates and stops.

Figure 4:
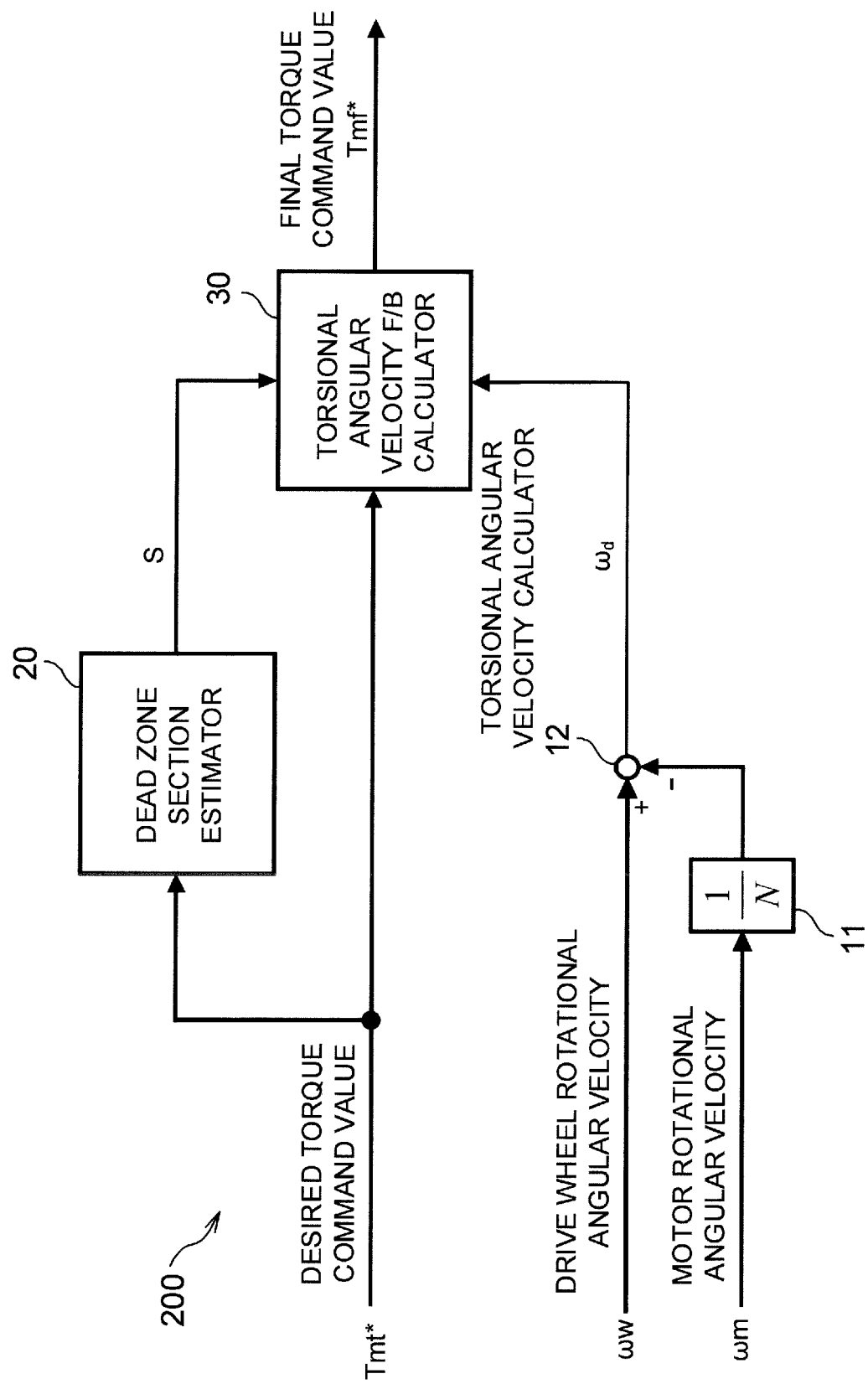
FIG. 4 is a block diagram illustrating an example of the functional configuration of a control device in the present embodiment.

FIG. 4 is a block diagram illustrating an example of the functional configuration of a vibration damping control calculator 200 in the electric motor controller 2.

The vibration damping control calculator 200 is a control block that sets the final torque command value Tmf* on the basis of the desired torque command value Tmt* such that the vibration of the vehicle is suppressed.

The vibration damping control calculator 200 includes a drive shaft converter 11, a torsional angular velocity calculator 12, a dead zone section estimator 20, and a torsional angular velocity F/B calculator 30.

The drive shaft converter 11 divides the motor rotational angular velocity ωm by an overall gear ratio N thereby to determine a value converted into a drive shaft rotational angular velocity.

The torsional angular velocity calculator 12 calculates, as the drive shaft torsional angular velocity ωd, the difference between the drive wheel rotational angular velocity ωw and the conversion value output from the drive shaft converter 11.

The dead zone section estimator 20 estimates the dead zone section of the vehicle on the basis of the desired torque command value Tmt*. The dead zone section of the vehicle in this case refers to a specific section in which the torque generated in the electric motor 4 is not transmitted to of the drive shaft 8.

According to the present embodiment, the desired torque command value Tmt* is input to the dead zone section estimator 20, and the dead zone section estimator 20 estimates the torsional angle of the drive shaft 8 by using the desired torque command value Tmt*. The dead zone section estimator 20 outputs a drive shaft torsional angle estimated value θd^, which indicates the estimated value, to the torsional angular velocity F/B calculator 30 as a determination signal S for determining whether the driving force transmission system of the vehicle is in the dead zone section.

The torsional angular velocity F/B calculator 30 feeds back the torsional angular velocity of the drive shaft 8 to the desired torque command value Tmt* thereby to calculate the final torque command value Tmf* for suppressing the component of torsional vibration attributable to the drive shaft 8. Further, if it is estimated that the driving force transmission system is in the dead zone section, then the torsional angular velocity F/B calculator 30 limits the final torque command value Tmf*.

According to the present embodiment, the desired torque command value Tmt* and the drive shaft torsional angle estimated value θd^ are input to the torsional angular velocity F/B calculator 30. Then, the torsional angular velocity F/B calculator 30 calculates the final torque command value Tmf* by using the desired torque command value Tmt*. At the same time, the torsional angular velocity F/B calculator 30 determines whether the torque generated in the electric motor 4 is in the dead zone section on the basis of the drive shaft torsional angle estimated value θd^. If it is determined that the torque is in the dead zone section, then the torsional angular velocity F/B calculator 30 corrects the final torque command value Tmf* such that the absolute value of the final torque command value Tmf* decreases.

Decreasing the absolute value of the final torque command value Tmf* in the dead zone section as described above decreases the relative change rate between gears at a backlash in the reduction gear 5, thus making it possible to suppress the occurrence of a vibration or a noise caused by the collision between gears.

Figure 5:
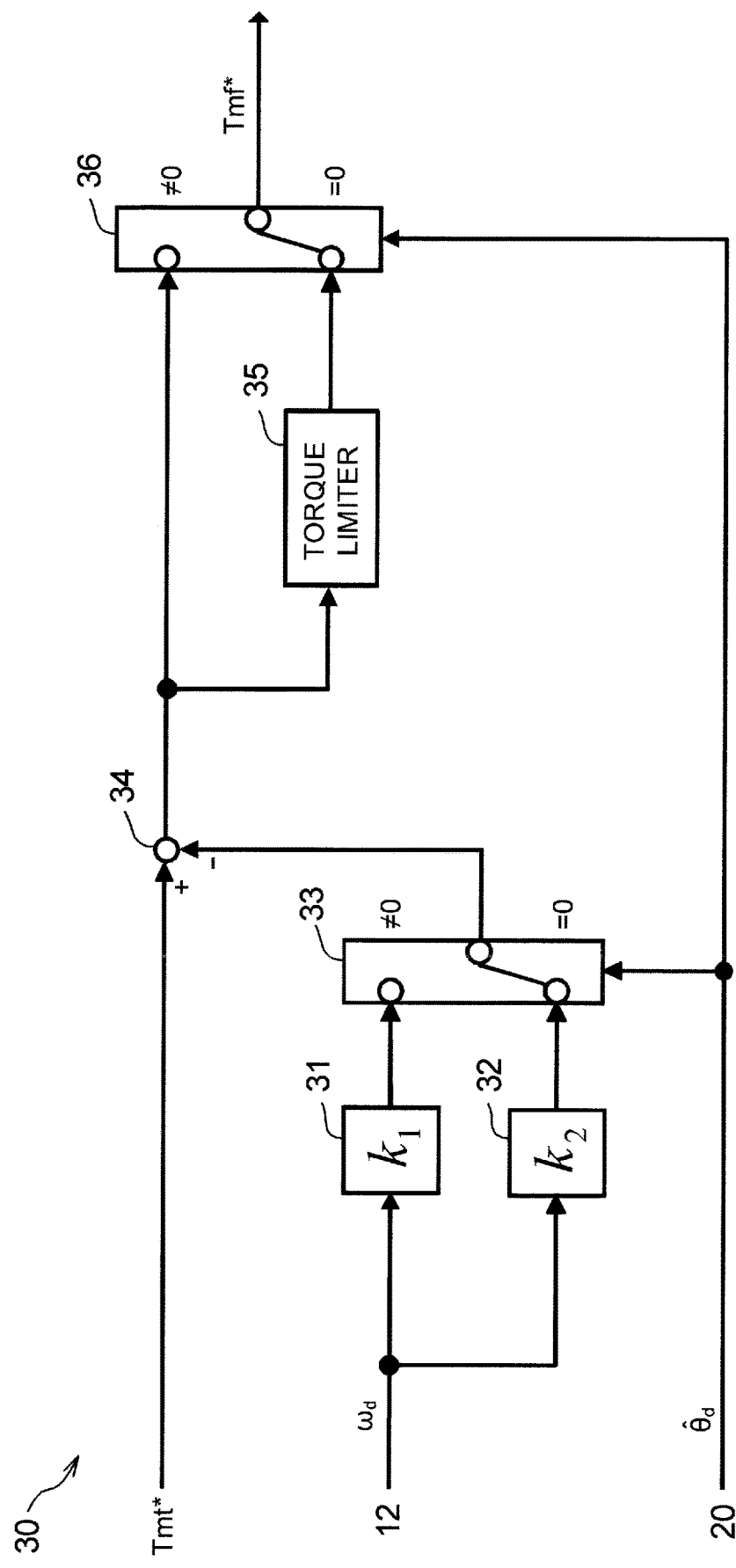
FIG. 5 is a block diagram illustrating an example of a torsional angular velocity F/B calculator that calculates a torque command value by feeding back a drive shaft torsional angular velocity to a desired torque of the motor.

FIG. 5 is a block diagram illustrating an example of the functional configuration of the torsional angular velocity F/B calculator 30.

The torsional angular velocity F/B calculator 30 includes gain multipliers 31 and 32, a gain switcher 33, a torsion compensator 34, a torque limiter 35, and a torque switcher 36.

The gain multiplier 31 holds a first feedback (FB) gain k1 set in a zone section other than the foregoing dead zone section. The first FB gain k1 is a predetermined value which is determined by a viscosity coefficient ζr1 of a model response in a zone section other than the dead zone section.

The gain multiplier 31 calculates a torsional angle compensation amount by multiplying the drive shaft torsional angular velocity ωd from the torsional angular velocity calculator 12 by the first FB gain k1. The gain multiplier 31 outputs the calculated torsional angle compensation amount to the gain switcher 33.

The gain multiplier 32 holds a second FB gain k2 set in the dead zone section of the driving force transmission system. The second FB gain k2 is a predetermined value which is determined by a viscosity coefficient ζr2 of a model response in the dead zone section. According to the present embodiment, the second FB gain k2 is set to a value that is smaller than the first FB gain k1. This decreases a force for reducing the torsion of the drive shaft 8, i.e. the force in the direction that is opposite from the rotational direction of the drive shaft 8, so that the responsiveness of the vehicle in the dead zone section can be increased.

The gain multiplier 32 calculates a torsional angle compensation amount by multiplying the drive shaft torsional angular velocity ωd from the torsional angular velocity calculator 12 by the second FB gain k2. The gain multiplier 32 outputs the calculated torsional angle compensation amount to the gain switcher 33.

The gain switcher 33 switches the torsional angle compensation amount to that of either the gain multipliers 31 or 32, depending on whether the torque of the electric motor 4 is in the dead zone section.

In the present embodiment, the gain switcher 33 outputs the torsional angle compensation amount of one of the gain multipliers 31 and 32 according to the torsional angle estimated value θd^ of the drive shaft 8. To be specific, if the torsional angle estimated value θd^ of the drive shaft 8 is non-zero, i.e. if the torque of the electric motor 4 is not in the dead zone section, then the gain switcher 33 outputs the torsional angle compensation amount from the gain multiplier 31 to the torsion compensator 34.

On the other hand, if the torsional angle estimated value θd^ of the drive shaft 8 is zero, i.e. if the torque of the electric motor 4 is in the dead zone section, then the gain switcher 33 outputs the torsional angle compensation amount from the gain multiplier 32 to the torsion compensator 34.

The torsion compensator 34 corrects the desired torque command value Tmt* such that the torsion of the drive shaft 8 is compensated. The torsion compensator 34 subtracts the torsional angle compensation amount from the gain switcher 33 from the desired torque command value Tmt* to calculate the final torque command value Tmf*. The torsion compensator 34 outputs the final torque command value Tmf* to the torque switcher 36 and the torque limiter 35.

The torque limiter 35 limits the absolute value of the final torque command value Tmf* from the torsion compensator 34. In other words, the torque limiter 35 limits the final torque command value Tmf* to a value within a predetermined allowable range. The allowable range is determined by carrying out experiments, simulations or the like such that noises and vibrations caused by backlashes are suppressed.

For example, in the case where the vehicle accelerates from a decelerated state, the final torque command value Tmf* increases. In this situation, if the final torque command value Tmf* increases to be greater than an upper limit value of the allowable range, then the torque limiter 35 sets the final torque command value Tmf* to the upper limit value of the allowable range.

On the other hand, in the case where the vehicle decelerates from an accelerated state, the final torque command value Tmf* decreases. In this situation, if the final torque command value Tmf* decreases to be smaller than a lower limit value of the allowable range, then the torque limiter 35 sets the final torque command value Tmf* to the lower limit value of the allowable range.

The torque limiter 35 outputs the limited final torque command value Tmf* to the torque switcher 36.

The torque switcher 36 switches the final torque command value Tmf* to that of either one of the torsion compensator 34 or the torque limiter 35, depending on whether the torque of the electric motor 4 is in the dead zone section.

According to the present embodiment, if the drive shaft torsional angle estimated value θd^ is non-zero, then the torque switcher 36 outputs the final torque command value Tmf* from the torsion compensator 34. In other words, if the torque of the electric motor 4 is not in the dead zone section, then the torque switcher 36 does not limit the final torque command value Tmf*.

On the other hand, if the drive shaft torsional angle estimated value θd^ is not zero, then the torque switcher 36 outputs the final torque command value Tmf* from the torque limiter 35. In other words, if the torque of the electric motor 4 is in the dead zone section, then the torque switcher 36 limits the final torque command value Tmf*. This leads to a decrease in the relative change rate between gears when overpassing a backlash, thus making it possible to suppress the occurrence of a vibration or a noise caused by the collision of the gears.

Figure 6:
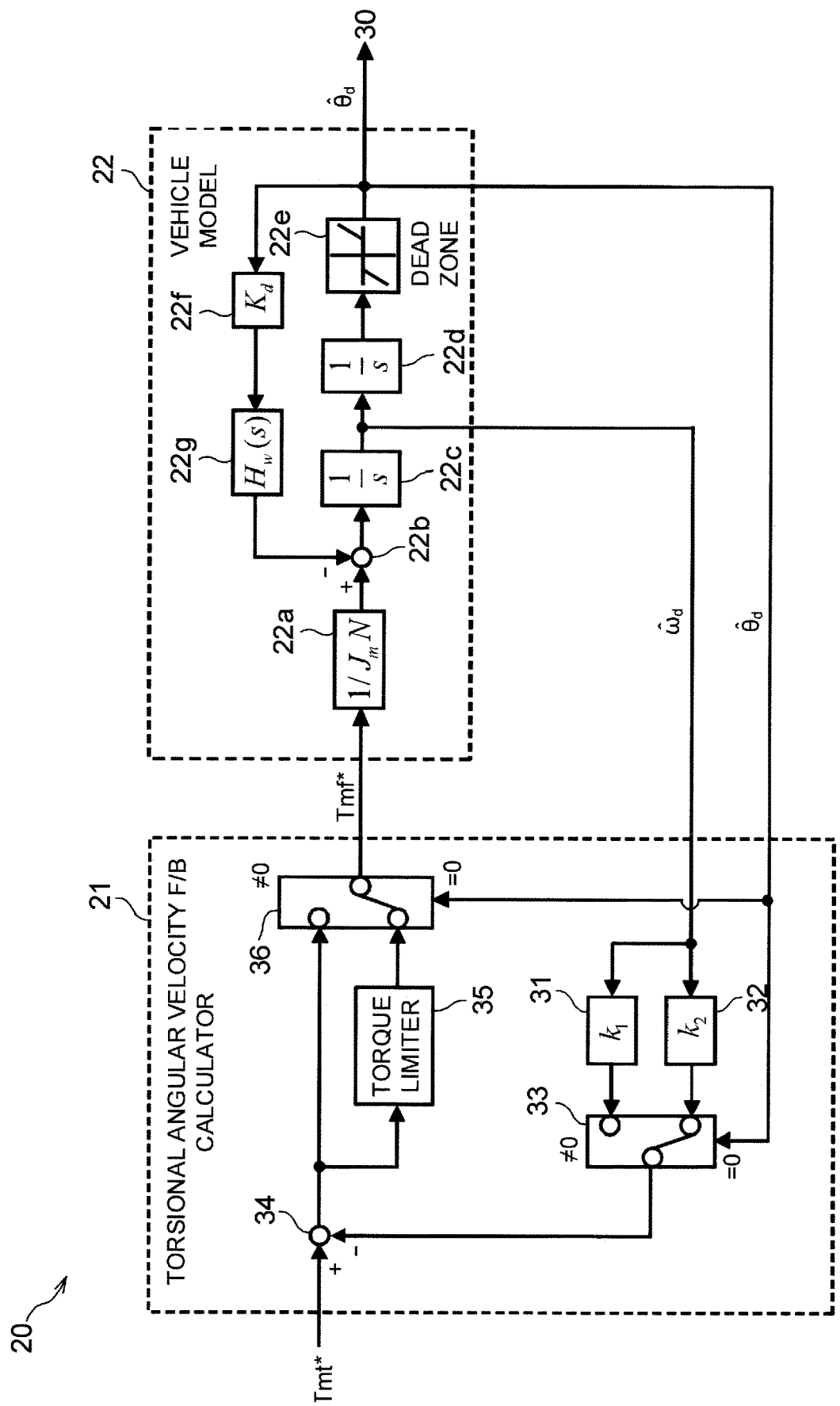
FIG. 6 is a block diagram illustrating an example of a dead zone section estimator that estimates whether a dead zone section, in which the torque of the motor is not transmitted to the drive shaft torque, is involved.

FIG. 6 is a block diagram illustrating an example of the functional configuration of the dead zone section estimator 20 in the present embodiment.

The dead zone section estimator 20 has a torsional angular velocity F/B calculator 21 and a vehicle model 22.

The torsional angular velocity F/B calculator 21 has the same configuration as that of the torsional angular velocity F/B calculator 30 illustrated in FIG. 5. Hence, like reference numerals will be assigned and detailed description will be omitted.

The vehicle model 22 is a model that simulates the response characteristic of the vehicle, and is composed of vehicle parameters and a dead zone model simulating a gear backlash in the reduction gear 5 in the present embodiment. The vehicle model 22 includes a proportional element 22a, a subtractor 22b, an integrator element 22c that generates the torsional angular velocity estimated value ωd^ of the drive shaft 8, an integrator element 22d that generates the torsional angle estimated value θd^ of the drive shaft 8, a dead zone element 22e, a proportional element 22f, and a filter 22g.

The deriving technique of the vehicle model 22 will be described below.

Figure 7A:
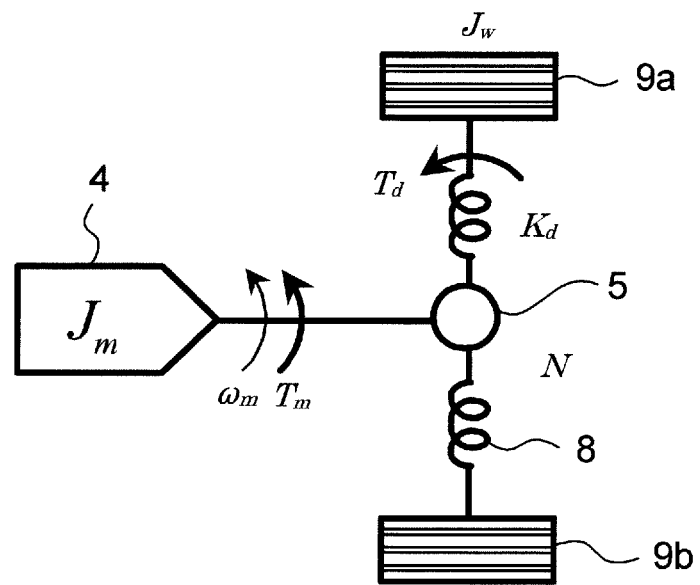
FIG. 7A is an explanatory diagram illustrating a vehicle model.
Figure 7B:
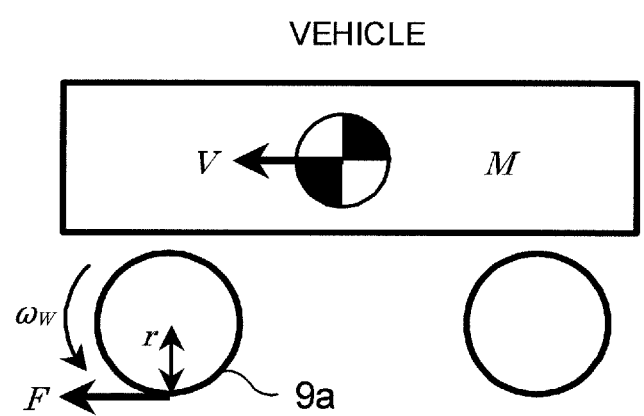
FIG. 7B is a side view of the vehicle illustrated in FIG. 7A.

FIG. 7A is a schematic diagram that models the driving force transmission system of a vehicle that has a motor connected to the drive wheels through gears, and FIG. 7B is a side view of the vehicle illustrated in FIG. 7A. The motion equations of the vehicle illustrated in FIG. 7A and FIG. 7B are given by expressions (1) to (6).

[MATH1]

$$J_m \cdot \dot{\omega}_m = T_m - T_d/N \quad (1)$$

$$2J_w \cdot \dot{\omega}_w = T_d - rF \quad (2)$$

$$M \cdot \dot{V} = F \quad (3)$$

$$T_d = K_d \cdot \theta \quad (4)$$

$$F = K_t \cdot (r\omega_m - V) \quad (5)$$

$$\theta = \int \left(\frac{\omega_m}{N_{al}} - \omega_w\right) dt \quad (6)$$

The parameters in expressions (1) to (6) are as follows.
Jm: Motor inertia
Jw: Drive wheel inertia (for one shaft)

M: Mass of vehicle
Kd: Torsional rigidity of drive shaft
Kt: Coefficient related to friction between tire and road surface
N: Overall gear ratio
r: Load radius of tire
ωm: Motor angular velocity
ωw: Drive wheel rotational angular velocity
Tm: Motor torque
Td: Drive shaft torque
F: Driving force (for two shafts)
V: Vehicle speed
θd: Torsional angle of drive shaft Expressions (1) to (6) are processed by the Laplace transform to determine the transmission characteristic from the motor torque Tm to the motor angular velocity ωm, thus deriving expression (7) and expression (8).

[MATH2]

$$\omega_m = G_p(s) \cdot T_m \quad (7)$$

$$G_p(s) = \frac{1}{s} \cdot \frac{b_3 s^3 + b_2 s^2 + b_1 s + b_0}{a_3 s^3 + a_2 s^2 + a_1 s + a_0} \quad (8)$$

The parameters in expression (8) are denoted by expressions (9) to (16) given below.

[MATH3]

$$a_3 = 2 J_m J_w M \quad (9)$$

$$a_2 = K_t J_m (2 J_w + r^2 M) \quad (10)$$

$$a_1 = K_d M (J_m + 2 J_w/N^2) \quad (11)$$

$$a_0 = K_d K_t (J_m + 2 J_w/N^2 + r^2 M/N^2) \quad (12)$$

$$b_3 = 2 J_w M \quad (13)$$

$$b_2 = K_t (2 J_w + r^2 M) \quad (14)$$

$$b_1 = K_d M \quad (15)$$

$$b_0 = K_d K_t \quad (16)$$

Further, the transmission characteristic from the motor torque Tm to the drive shaft torque Td is denoted by expression (17), and parameters c1 and c0 in expression (17) are denoted by expressions (18) and (19), respectively.

[MATH4]

$$\frac{T_d}{T_m} = \frac{c_1 s + c_0}{a_3 s^3 + a_2 s^2 + a_1 s + a_0} \quad (17)$$

$$c_1 = 2 K_d J_w M / N \quad (18)$$

$$c_0 = K_d K_t (2 J_w + r^2 M) / N \quad (19)$$

Based on expression (2) and expressions (4) to (6), the transmission characteristic from the motor rotational angular velocity ωm to the drive wheel rotational angular velocity ωw is determined by expression (20) given below.

[MATH5]

$$\frac{\omega_w}{\omega_m} = \frac{b_1 s + b_0}{b_3 s^3 + b_2 s^2 + b_1 s + b_0} \cdot \frac{1}{N} \quad (20)$$

Based on expression (7), expression (8) and expression (20), the transmission characteristic from the torque command value Tm to the drive wheel rotational angular velocity ωw is denoted by expression (21) given below.

[MATH6]

$$\frac{\omega_w}{T_m} = \frac{1}{N} \cdot \frac{1}{s} \cdot \frac{b_1 s + b_0}{a_3 s^3 + a_2 s^2 + a_1 s + a_0} \quad (21)$$

Based on expression (17) and expression (21), the transmission characteristic from the drive shaft torque Td to the drive shaft angular velocity ωw is denoted by expression (22) given below.

[MATH7]

$$\omega_w = \frac{1}{N} \cdot \frac{1}{s} \cdot \frac{b_1 s + b_0}{c_1 s + c_0} T_d \quad (22)$$

Expression (23) given below is derived by transforming expression (1).

[MATH8]

$$\frac{\omega_m}{N} = \frac{1}{J_m N s} T_m - \frac{1}{J_m N^2 s} T_d \quad (23)$$

Therefore, based on expression (22) and expression (23), the drive shaft torsional angular velocity ωd is denoted by expression (24) given below.

[MATH9]

$$\omega_d = \frac{\omega_m}{N} - \omega_w \quad (24)$$

$$= \frac{1}{J_m N s} T_m - \frac{1}{J_m N^2 s} T_d - \frac{1}{N} \cdot \frac{1}{s} \cdot \frac{b_1 s + b_0}{c_1 s + c_0} T_d$$

$$= \frac{1}{s} \cdot \left( \frac{T_m}{J_m N} - H_w(s) \cdot T_d \right)$$

Hw (s) in expression (24) is denoted by expressions (25) to (29).

[MATH10]

$$H_w(s) = \frac{v_1 s + v_0}{w_1 s + w_0} \quad (25)$$

$$v_1 = J_m N b_1 + c_1 = 2 J_w M N (J_m + K_d / N^2) \quad (26)$$

$$v_0 = J_m N b_0 + c_0 = K_d K_t (2 J_m N^2 + 2 J_w + r^2 M) / N \quad (27)$$

$$w_1 = J_m N^2 c_1 = 2 K_d J_m J_w M N \quad (28)$$

$$w_0 = J_m N^2 c_0 = K_d K_t J_m (2 J_w + r^2 M) N \quad (29)$$

Further, expression (17) can be transformed to expression (30) given below.

[MATH11]

$$\frac{T_d}{T_m} = \frac{c_1 s + c_0}{a_3 s^3 + a_2 s^2 + a_1 s + a_0} = \frac{c_1}{a_3} \cdot \frac{s + c_0/c_1}{(s+\alpha)(s^2 + 2\zeta_p \omega_p s + \omega_p^2)} \quad (30)$$

$\zeta p$ denotes the attenuation coefficient of the drive torque transmission system, and $\omega p$ denotes the natural vibration frequency of the drive torque transmission system.

Further, the pole and zero point in expression (30) are expressed by $\alpha \approx c_0/c_1$. Hence, expression (31) is derived from pole-zero cancellation.

[MATH12]

$$T_d = \frac{g_t}{s^2 + 2\zeta_p \omega_p s + \omega_p^2} T_m \quad (31)$$

$$g_t = c_0/(a_3 \cdot \alpha)$$

The final torque command value Tmf* is assumed as denoted by expression (32) given below.

[MATH13]

$$T_{mf}^* = T_m^* - k_1 \omega_d \quad (32)$$

Expression (32) can be transformed to expression (33) given below on the basis of expression (4) and expression (6).

[MATH14]

$$T_{mf}^* = T_m^* - (k_1 s) T_d / K_d \quad (33)$$

When expression (33) is substituted into expression (31), assuming that Tm=Tmf*, the transmission characteristic of the drive shaft torsional angular velocity F/B system is denoted by expression (34) given below.

[MATH15]

$$T_d = \frac{g_t}{s^2 + (2\zeta_p \omega_p + g_t K_1/K_d)s + \omega_p^2} T_m^* \quad (34)$$

Further, if the desired torque command value Tmt* is assumed to be the motor torque Tm, then the model response from the motor torque Tm to the drive shaft torque Td is denoted by expression (35) given below.

[MATH16]

$$T_d = \frac{g_t}{s^2 + 2\omega_p s + \omega_p^2} T_m^* \quad (35)$$

The condition under which expression (34) and expression (35) agree, i.e. the condition under which the transmission characteristic of the drive shaft torsional angular velocity F/B system and the model response agree, is denoted by expressions (36) and (37) given below.

[MATH17]

$$k_1 = 2(\zeta_{r1} - \zeta_p) \omega_p K_d / g_t \quad (36)$$

$$k_2 = 2(\zeta_{r2} - \zeta_p) \omega_p K_d / g_t \quad (37)$$

Coefficient $\zeta r1$ in expression (36) denotes the viscosity coefficient of the model response in a section other than the dead zone section, and coefficient $\zeta r2$ in expression (37) denotes the viscosity coefficient of the model response in the dead zone section. For example, the viscosity coefficient $\zeta r2$ in the dead zone section may be set to a value that is equal to the viscosity coefficient $\zeta r1$ in a section other than the dead zone section ($\zeta r2 = \zeta r1$).

In the present embodiment, the viscosity coefficient $\zeta r2$ in the dead zone section is set to a value that is smaller than the viscosity coefficient $\zeta r1$ in a section other than the dead zone section ($\zeta r2 < \zeta r1$) in order to reduce the response delay in the dead zone section. Therefore, the second FB gain k2 becomes smaller than the first FB gain k1, and the compensation amount for suppressing the torsion of the drive shaft 8 becomes smaller, thus making it possible to restrain the responsiveness of the vehicle from decreasing.

Next, when the backlash characteristic from the motor to the drive shaft is modeled on the basis of the dead zone by applying expressions (1) to (29), the drive shaft torque Td is denoted by expression (30) given below.

[MATH18]

$$T_d = \begin{cases} K_d(\theta - \theta_{dead}/2) & (\theta_d \geq \theta_{dead}/2) \\ 0 & (-\theta_{dead}/2 < \theta_d < \theta_{dead}/2) \\ K_d(\theta_d + \theta_{dead}/2) & (\theta_d \leq -\theta_{dead}/2) \end{cases} \quad (38)$$

$\theta$dead denotes the overall backlash amount from the motor to the drive shaft.

Thus, according to the foregoing expressions (1) to (38), the vehicle model 22 illustrated in FIG. 6 carries out arithmetic processing that takes into account the vehicle parameters and the dead zone model, which simulates the gear backlash.

As illustrated in FIG. 6, the vehicle model 22 acquires the final torque command value Tmf* from the torsional angular velocity F/B calculator 21 and calculates the torsional angular velocity estimated value $\omega d\hat{}$ of the drive shaft 8 on the basis of the final torque command value Tmf*. The vehicle model 22 outputs the torsional angular velocity estimated value $\omega d\hat{}$ to the gain multipliers 31 and 32 of the torsional angular velocity F/B calculator 21.

Then, the vehicle model 22 calculates the torsional angle estimated value $\theta d\hat{}$ of the drive shaft 8 on the basis of the final torque command value Tmf*, and outputs the torsional angle estimated value $\theta d\hat{}$ to the gain switcher 33 and the torque switcher 36 of the torsional angular velocity F/B calculator 21.

If the torsional angle estimated value $\theta d\hat{}$ is non-zero, then the torsional angular velocity F/B calculator 21 determines that the reduction gear 5 is not in the dead zone section. In this case, the torsional angular velocity F/B calculator 21 multiplies the torsional angular velocity estimated value $\omega d\hat{}$ by the first FB gain k1 to determine the torsional compensation amount, and outputs a value, which is obtained by subtracting the torsional compensation amount from the desired torque command value Tmt*, as the final torque command value Tmf*.

On the other hand, if the torsional angle estimated value $\theta d\hat{}$ is zero, then the torsional angular velocity F/B calculator 21 determines that the reduction gear 5 is in the dead zone section. In this case, the torsional angular velocity F/B calculator 21 multiplies the torsional angular velocity estimated value $\omega d\hat{}$ by the second FB gain k2, which is smaller than the first FB gain k1, to determine the torsional compensation amount, and outputs a value, which is obtained by subtracting the torsional compensation amount from the desired torque command value Tmt*, as the final torque command value Tmf*.

Then, the vehicle model 22 acquires the final torque command value Tmf* from the torsional angular velocity F/B calculator 21, calculates the torsional angle estimated value θd^ on the basis of the final torque command value Tmf*, and outputs the calculation result to the torsional angular velocity F/B calculator 30 as the determination signal of the dead zone section.

Thus, the dead zone section estimator 20 acquires the desired torque command value Tmt*, generates a determination signal of the dead zone section by feedforward control using the desired torque command value Tmt*, and outputs the determination signal to the torsional angular velocity F/B calculator 30.

Figure 8:
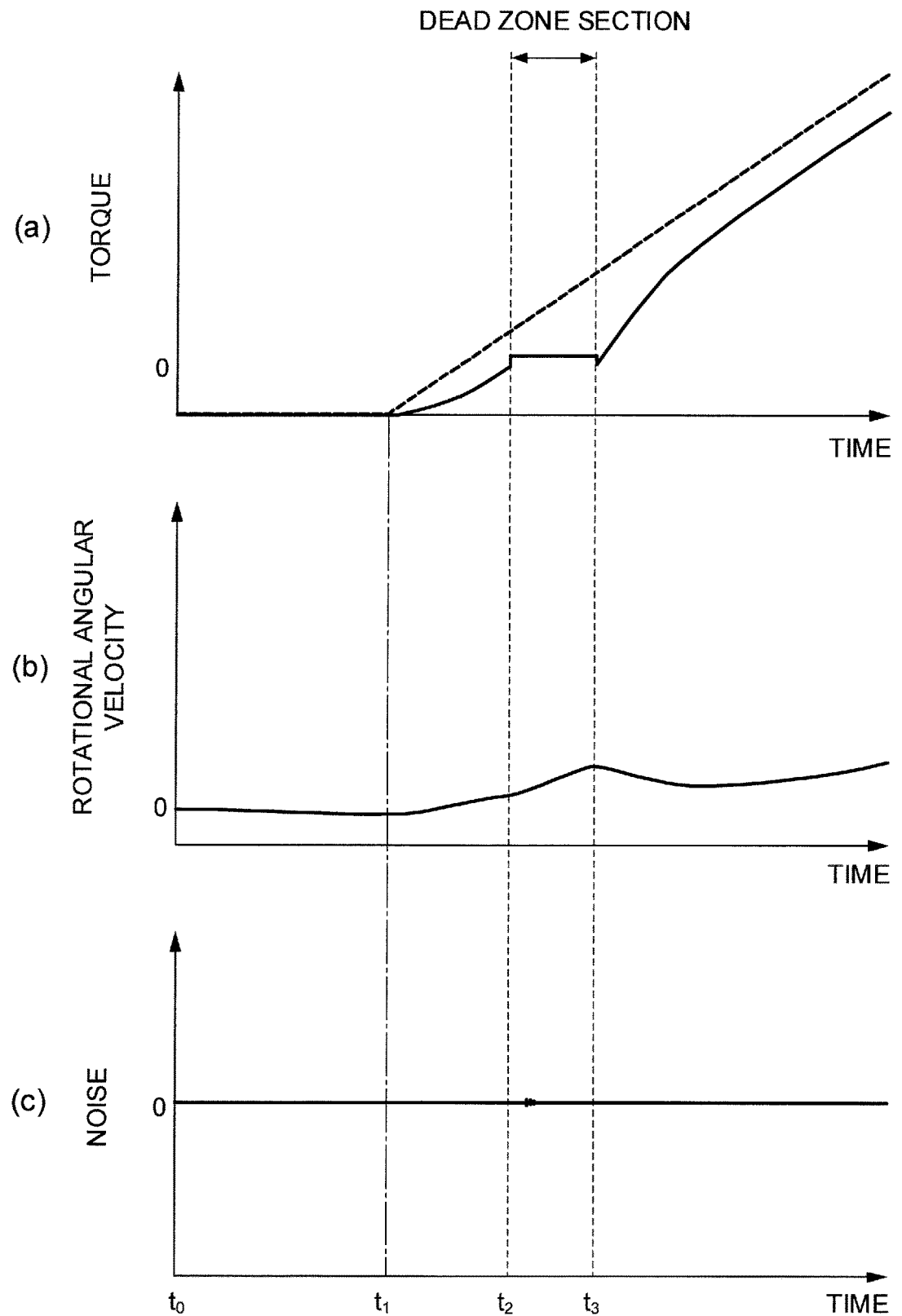
FIG. 8 presents explanatory diagrams illustrating the operational states of the vehicle when the vehicle accelerates from a decelerated state in the present embodiment.

FIG. 8 presents diagrams illustrating the magnitude of a backlash noise in the vehicle control method according to the present embodiment. In FIG. 8, the state of the vehicle when the vehicle is accelerated from a decelerated state is illustrated.

FIG. 8 (a) illustrates the final torque command value Tmf*, i.e. the changes in the torque generated in the electric motor 4, by the solid line, and the desired torque command value Tmt* by the dashed line. FIG. 8 (b) illustrates changes in the motor rotational angular velocity ωm. FIG. 8 (c) illustrates changes in the noise that take place in the vehicle. The axes of abscissas of FIGS. 8 (a) to (c) are time axes common to each other.

At time t0, the desired torque command value Tmt* is a negative value as illustrated in FIG. 8 (a), and the vehicle is decelerated by the regenerative braking force of the electric motor 4.

At time t1, the desired torque command value Tmt* starts to increase toward the positive side. This causes the regenerative braking force of the electric motor 4 to decrease, and the vehicle gradually switches from the decelerated state to an accelerated state. At this time, the final torque command value Tmf* increases as the change rate of the motor rotational angular velocity ωm increases.

The torsional angular velocity of the drive shaft 8 increases immediately after time t1. Hence, the final torque command value Tmf* is set to a small value with respect to the desired torque command value Tmt* such that the torsional angle vibration will be small. As the torsional angular velocity of the drive shaft 8 increases, the deviation from the desired torque command value Tmt* increases.

At time t2, the reduction gear 5 enters the dead zone section, so that the final torque command value Tmf* is limited to an upper limit value of a predetermined allowable range, as illustrated in FIG. 8 (a).

According to the present embodiment, the torsional angle estimated value θd^ of the drive shaft 8 is set to zero by the dead zone section estimator 20. Therefore, the second FB gain k2, which is smaller than the first FB gain k1, is selected in the torsional angular velocity F/B calculator 30. This causes the final torque command value Tmf* to steeply increase, thus making it possible to suppress the decrease of the responsiveness when overpassing a backlash.

At time t2, the final torque command value Tmf* that has increased due to the changeover to the second FB gain k2 is larger than the upper limit value of the allowable range, so that the final torque command value Tmf* is set to the upper limit value of the allowable range by the torque limiter 35.

As described above, the torque input to the driving force transmission system from the electric motor 4 is suppressed so as not to become excessively large. Thus, a noise caused by the collision between gears when overpassing a backlash in the reduction gear 5, is suppressed to be small, as illustrated in FIG. 8 (c).

Figure 9:
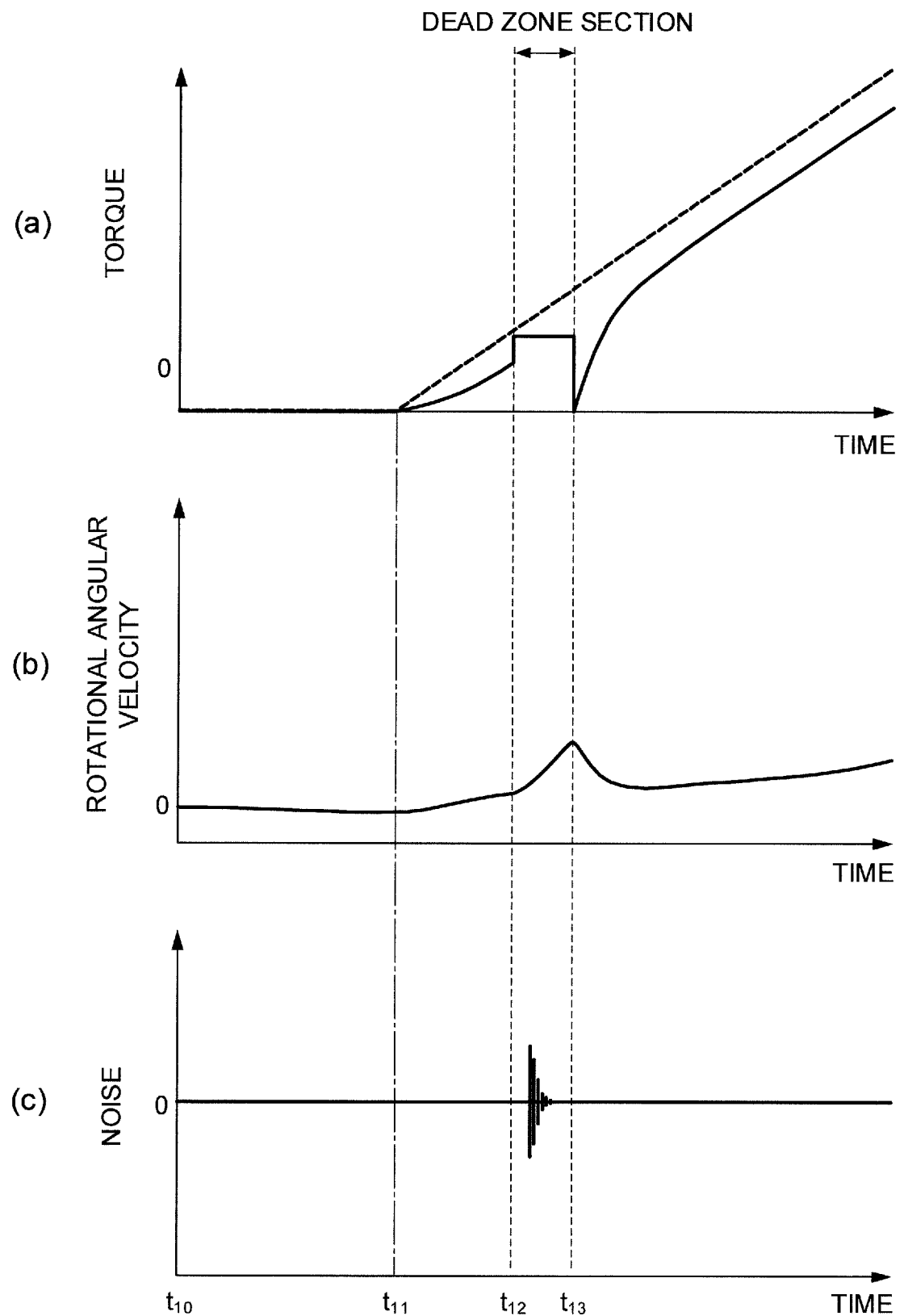
FIG. 9 presents comparative diagrams illustrating the operational state of the vehicle in the case where a torque command value is not limited.

FIG. 9 presents comparative diagrams illustrating changes in a backlash noise in a control method in which the final torque command value Tmf* is not limited in the dead zone section.

As with FIG. 8, FIG. 9 illustrates the state of the vehicle when the vehicle is accelerated from the decelerated state. The axes of ordinates in FIGS. 9 (a) to (c) are the same as the axes of ordinates in FIGS. 8 (a) to (c), and the axes of abscissas in FIGS. 9 (a) to (c) are time axes common to each other.

During the period of time t12 to time t13, the reduction gear 5 is in the dead zone section, so that the FB gain for calculating the torsional compensation amount is switched from the first FB gain k1 to the second FB gain k2 such that the response delay of the vehicle becomes small. This decreases the torsional compensation amount subtracted from the desired torque command value Tmt*, thus causing the final torque command value Tmf* to increase in a pulse-like shape, as illustrated in FIG. 9 (a).

In this example, the final torque command value Tmf* is not limited in the dead zone section, so that the motor rotational angular velocity ωm is gradually increased by the feedback control and the relative speeds of gears in the reduction gear 5 will become too high, as illustrated in FIG. 9 (b). As a result, the noise attributable to the collision between the gears increases, as illustrated in FIG. 9 (c).

Thus, the attempt to secure the responsiveness of the vehicle in the dead zone section inconveniently results in an increase in the noise caused by a backlash. In contrast to this, the present embodiment makes it possible to suppress a noise or a vibration that occur when overpassing a backlash, while at the same time securing the responsiveness of the vehicle by limiting the final torque command value Tmf* in the dead zone section, as illustrated in FIG. 8.

In the example of FIG. 8, the final torque command value Tmf* has been limited to the upper limit value of the allowable range when the vehicle was accelerated from the decelerated state. The same operation and effect can be obtained by limiting the final torque command value Tmf* even when the vehicle is decelerated from an accelerated state.

For example, if the final torque command value Tmf* decreases below a lower limit value of the allowable range in the dead zone section in a situation, in which the desired torque command value Tmt* monotonically decreases from the positive side to the negative side, then the torque limiter 35 sets the final torque command value Tmf* to the lower limit value of the allowable range. Thus, the noise attributable to a backlash can be suppressed by limiting the absolute value of the final torque command value Tmf* to a predetermined value in the dead zone section.

Figure 10:
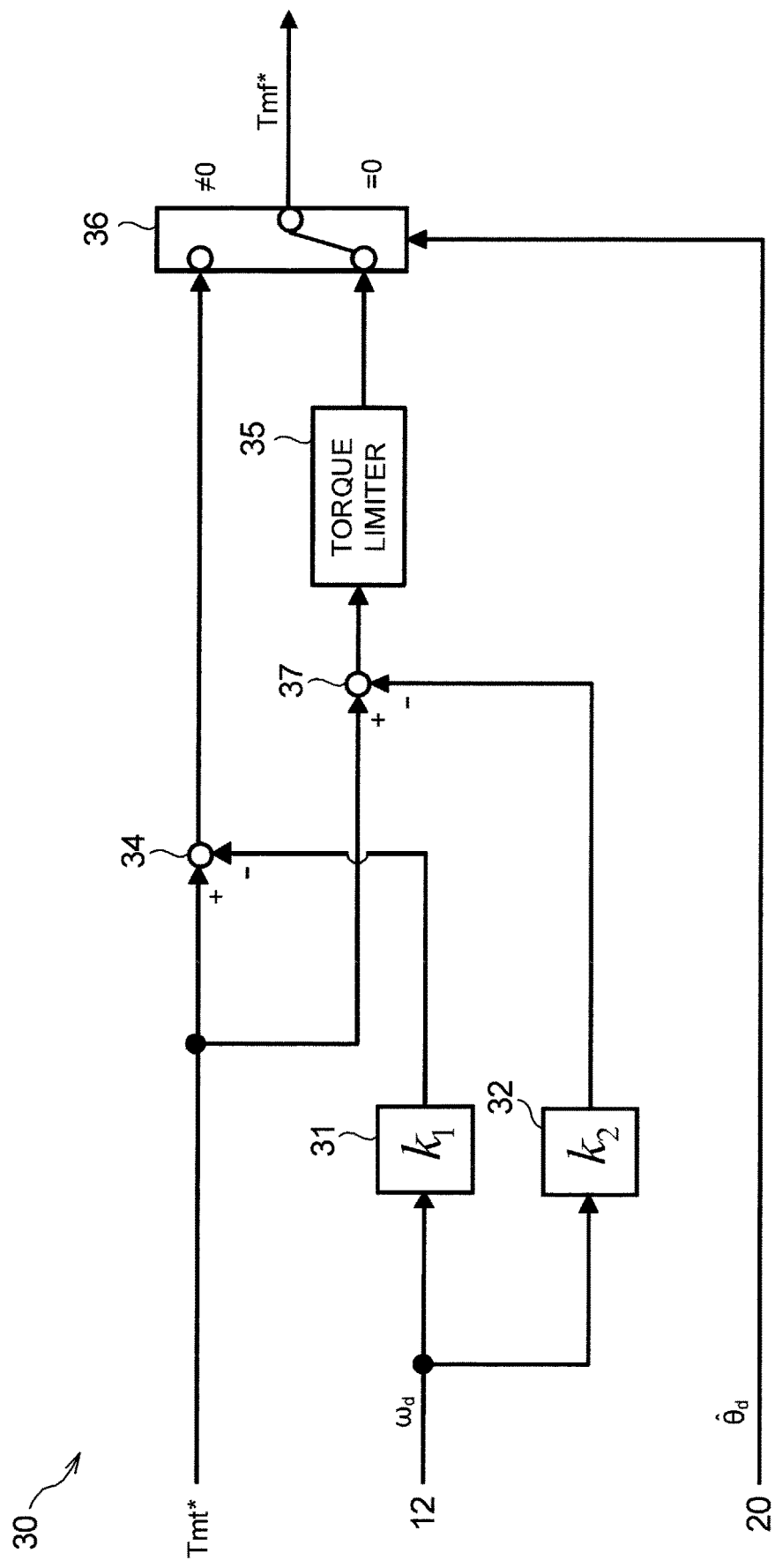
FIG. 10 is a block diagram illustrating another example of a torsional angular velocity F/B calculator in the present embodiment.

FIG. 10 is a diagram illustrating another functional configuration example of the torsional angular velocity F/B calculator 30 in the present embodiment.

A torsional angular velocity F/B calculator 30 illustrated in FIG. 10 is provided with a torsion compensator 37 in place of the gain switcher 33 of the torsional angular velocity F/B calculator illustrated in FIG. 5. The rest of the configuration is the same as the configuration of the torsional angular velocity F/B calculator illustrated in FIG. 5, so that like reference numerals will be assigned and the detailed descriptions thereof will be omitted.

A torsion compensator 34 calculates a final torque command value Tmf* by subtracting the torsional compensation amount, which is obtained by multiplying a drive shaft torsional angular velocity ωd by a first FB gain k1 by a gain multiplier 31, from a desired torque command value Tmt*. The torsion compensator 34 outputs the final torque command value Tmf* to a torque switcher 36.

The torsion compensator 37 calculates the final torque command value Tmf* by subtracting the torsional compensation amount, which is obtained by multiplying a drive shaft torsional angular velocity ωd by a second FB gain k2 by a gain multiplier 32, from a desired torque command value Tmt*. The torsion compensator 37 outputs the final torque command value Tmf* to a torque limiter 35.

Thus, even the configuration having the torsion compensator 37 in place of the gain switcher 33 illustrated in FIG. 5 can reduce the torsional compensation amount and also limit the final torque command value Tmf* in the dead zone section. This makes it possible to suppress the occurrence of noises and vibrations attributable to gear backlashes, while at the same time suppressing a delay in responsiveness of the vehicle.

In place of the configuration illustrated in FIG. 6, the same configuration as the configuration illustrated in FIG. 10 may be applied to the configuration of a torsional angular velocity F/B calculator 21 of a dead zone section estimator 20 of the present embodiment.

According to the first embodiment of the present invention, the electric motor controller 2 performs deceleration by the regenerative braking of the electric motor 4 connected to the drive shaft 8 of the drive wheels 9a and 9b of the vehicle. The electric motor controller 2 calculates the torque command value Tmf* for suppressing the vibration component of the drive shaft 8 by feeding back the torsional angular velocity ωd of the drive shaft 8 with respect to the desired torque command value Tmt* for determining the power of the electric motor 4. Then, the electric motor controller 2 estimates the dead zone section, in which the torque of the electric motor 4 is not transmitted to the drive shaft 8, on the basis of the desired torque command value Tmt*, and if it is estimated that the torque of the electric motor 4 is in the dead zone section, then the electric motor controller 2 limits the torque command value Tmf*. Based on the torque command value Tmf*, the electric motor controller 2 controls the operation of the electric motor 4.

When the torsional angular velocity ωd of the drive shaft 8 is fed back such that the torsional vibration of the drive shaft 8 decreases, the torque command value Tmf* increases as the change rate of the motor rotational angular velocity increases in the dead zone section. As a result, a noise or a vibration takes place due to a backlash of the vehicle.

As the corrective measures, according to the present embodiment, the dead zone section in the vehicle is estimated, and the torque command value Tmf* is limited in the dead zone section, thereby making it possible to suppress a noise or a vibration attributable to a backlash while at the same time suppressing the torsional vibration of the drive shaft 8.

Further, according to the present embodiment, the electric motor controller 2 calculates the torque command value Tmf* by subtracting the torsional compensation amount, which has a value obtained by multiplying the torsional angular velocity cod of the drive shaft 8 by the feedback (FB) gain k1, from the desired torque command value Tmt*. If it is estimated that the torque generated in the electric motor 4 is in the dead zone section, then the electric motor controller 2 switches the feedback gain from the feedback gain k1 to the feedback gain k2 to decrease the feedback gain used for calculating the torsional compensation amount so as to increase the responsiveness of the electric motor 4.

As described above, the torsional compensation amount subtracted from the desired torque command value Tmt* is decreased by decreasing the feedback gain, by which the torsional angular velocity ωd of the drive shaft 8 is multiplied, in the dead zone section, thus enabling the responsiveness of the vehicle to be improved. Hence, a noise or a vibration attributable to a backlash in the dead zone section can be suppressed while at the same time securing the responsiveness of the vehicle.

Further, according to the present embodiment, the electric motor controller 2 determines whether the torque generated in the electric motor 4 is in the dead zone section on the basis of the estimated value of a torsional angle θd^ calculated by the vehicle model 22 simulating the response characteristic of the vehicle. If the estimated value of a torsional angle θd^ is a predetermined value, e.g. 0 (zero), then the electric motor controller 2 determines that the torque is in the dead zone section. If the estimated value of a torsional angle θd^ is non-zero, then the electric motor controller 2 determines that the torque is in a section other than the dead zone section.

As described above, whether the vehicle is in the dead zone section can be accurately determined by using the vehicle model 22 composed of a dead zone model simulating a gear backlash, so that the torque command value Tmf* can be precisely limited.

Second Embodiment

Figure 11:
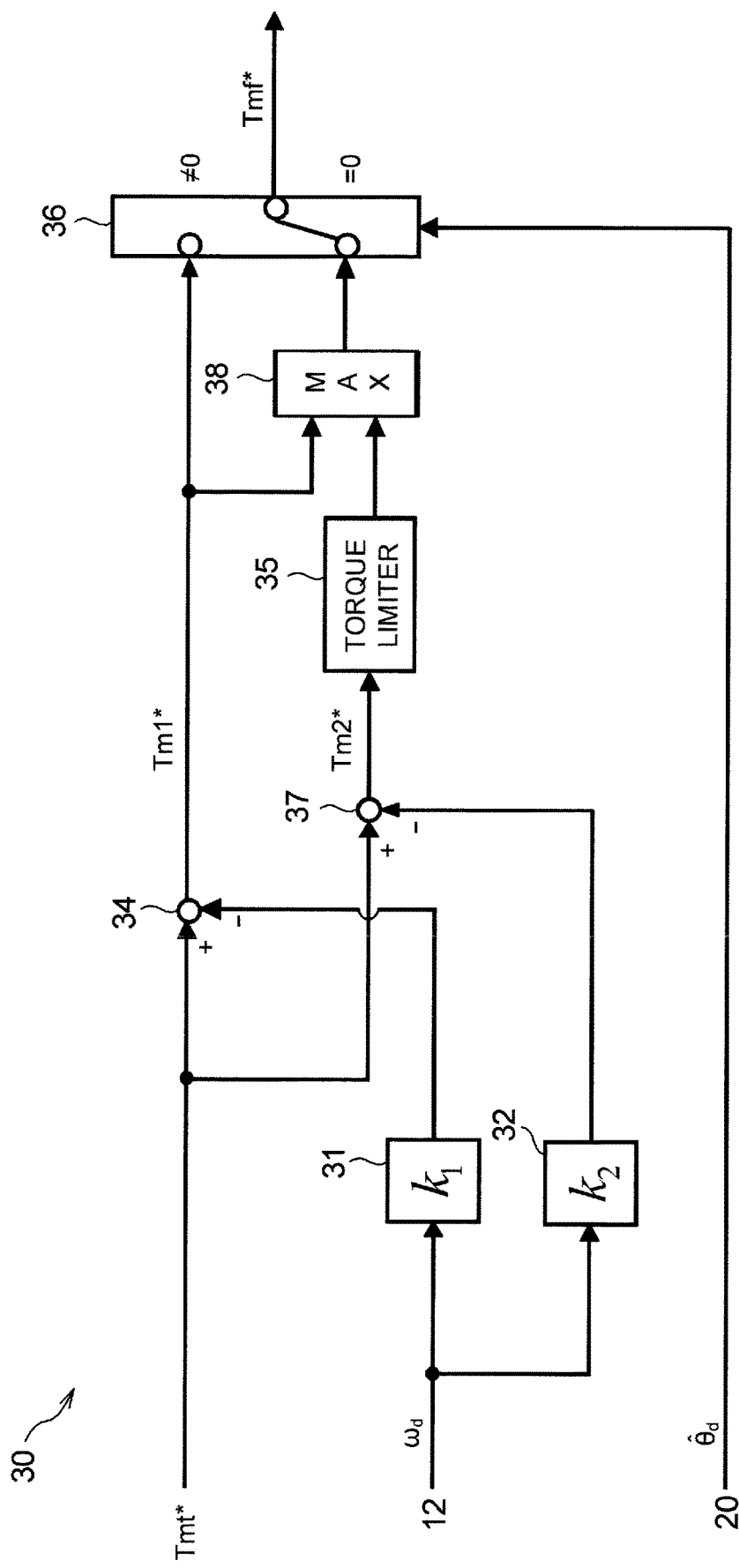
FIG. 11 is a block diagram illustrating an example of a torsional angular velocity F/B calculator in a second embodiment of the present invention.

FIG. 11 is a block diagram illustrating the functional configuration of a torsional angular velocity F/B calculator 30 in a second embodiment of the present invention.

The torsional angular velocity F/B calculator 30 of the present embodiment is provided with a max selector 38 in addition to the configuration of the torsional angular velocity F/B calculator illustrated in FIG. 10. The rest of the configuration is the same as the configuration illustrated in FIG. 10, so that like reference numerals will be assigned and the detailed description will be omitted.

The max selector 38 acquires a final torque command value Tmf* of a section other than a dead zone section from a torsion compensator 34 and a final torque command value Tmf* in the dead zone section from a torque limiter 35. Then, the max selector 38 selects the final torque command value Tmf* of the section other than the dead zone section or the final torque command value Tmf* in the dead zone section, whichever has a greater value, and outputs the selected value, as the final torque command value Tmf* in the dead zone section, to a torque switcher 36.

Thus, providing the max selector 38 in a subsequent stage of the torque limiter 35 makes it possible to increase the final torque command value Tmf* to be greater than a value limited to a noise/vibration allowable range in the case where the temporal change rate of the final torque command value Tmf* is high.

Hence, if the acceleration of a vehicle is high and the final torque command value Tmf* of a section other than the dead zone section exceeds an upper limit value of the noise/vibration allowable range, then the final torque command value Tmf* is set to be a value that is greater than the upper limit value of the noise/vibration allowable range, thus making it possible to suppress the decrease of the responsiveness of the vehicle. Hence, when the temporal change rate of the desired torque command value Tmt* increases to a certain extent, a higher priority can be given to securing the responsiveness of the vehicle than suppressing a noise or a vibration attributable to a backlash.

In other words, according to the present embodiment, the suppression of a noise or a vibration attributable to a gear backlash and the securing of the vehicle responsiveness can be achieved in good balance according to the magnitude of the temporal change rate of the desired torque command value Tmt*.

Figure 12:
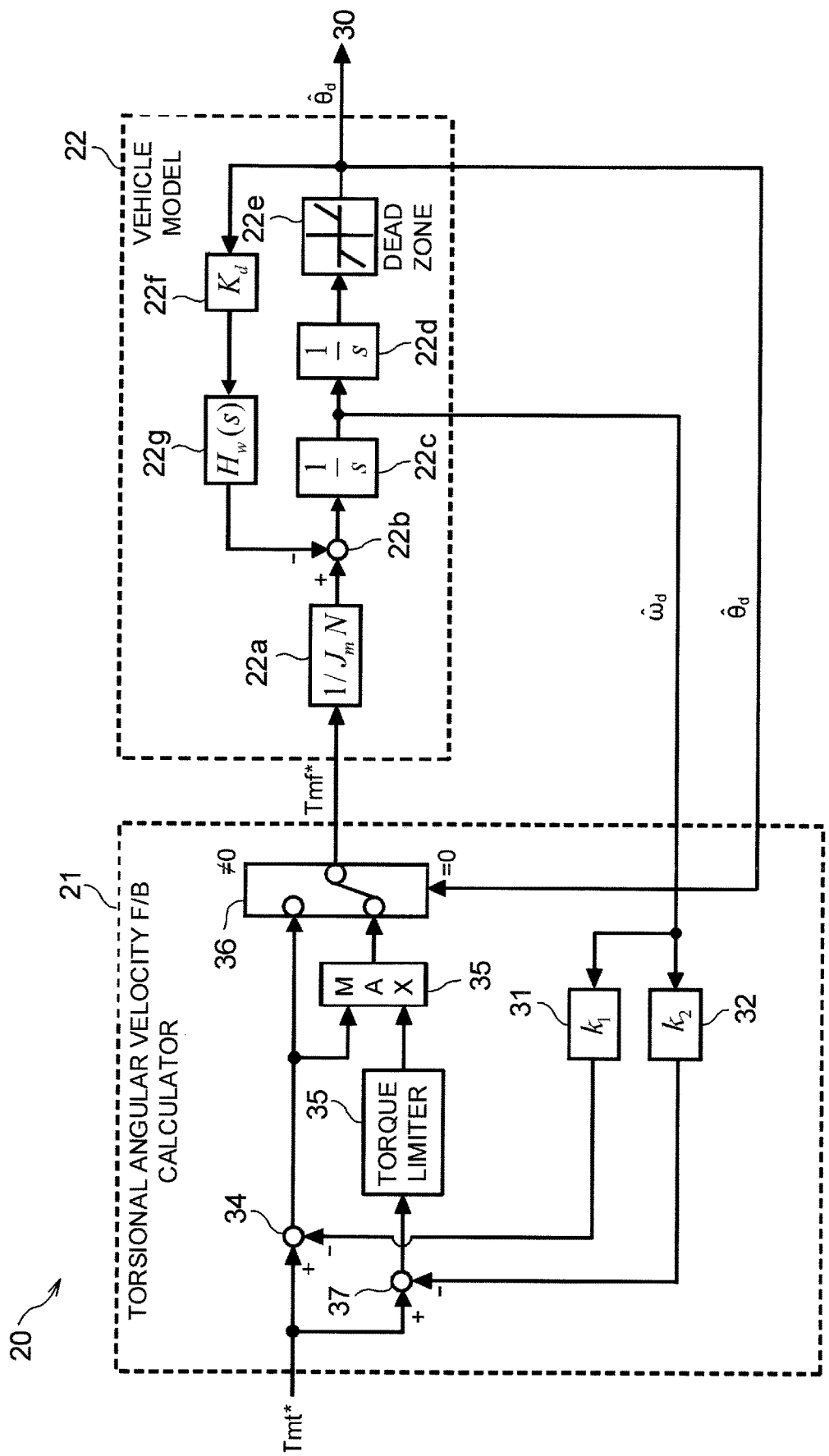
FIG. 12 is a block diagram illustrating an example of a dead zone section estimator in the present embodiment.

FIG. 12 is a block diagram illustrating an example of the functional configuration of a dead zone section estimator 20 in the present embodiment.

The dead zone section estimator 20 of the present embodiment includes a torsional angular velocity F/B calculator 21 and a vehicle model 22.

The configuration of the torsional angular velocity F/B calculator 21 of the present embodiment is basically the same as the configuration of the torsional angular velocity F/B calculator 30 illustrated in FIG. 11. Further, the configuration of the vehicle model 22 is the same as the configuration of the vehicle model illustrated in FIG. 5.

As described above, the dead zone section can be accurately estimated by providing the torsional angular velocity F/B calculator 21 in the dead zone section estimator 20 with the same configuration as that of the torsional angular velocity F/B calculator 30 illustrated in FIG. 11.

Figure 13:
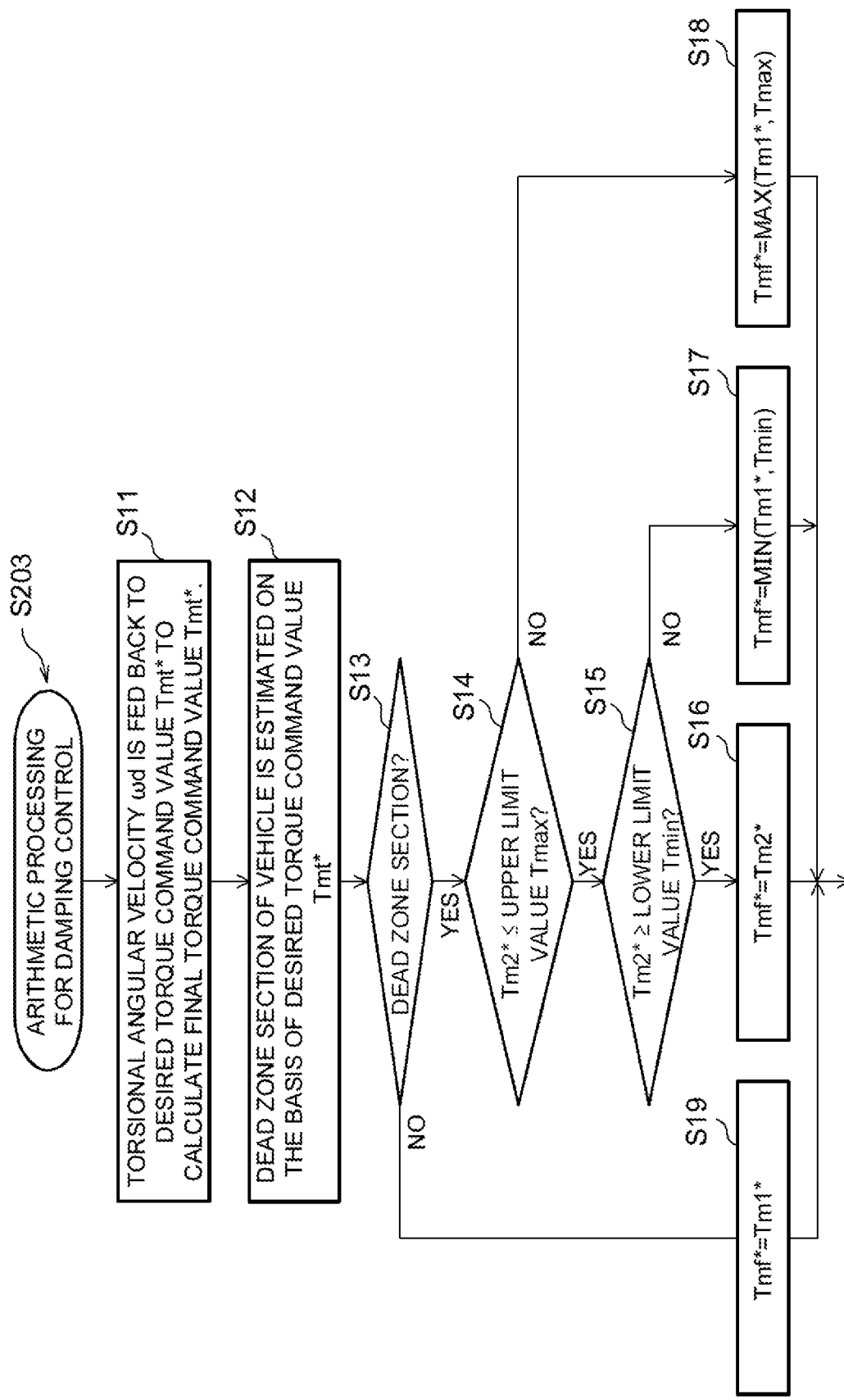
FIG. 13 is a flowchart illustrating an example of the processing procedure related to a control method for an electric vehicle in the present embodiment.

FIG. 13 is a flowchart illustrating an example of the processing procedure related to the vibration damping control arithmetic processing carried out in step S203.

In step S11, an electric motor controller 2 calculates the final torque command value Tmf* by feeding back a drive shaft torsional angular velocity ωd to the desired torque command value Tmt* in the torsional angular velocity F/B calculator 30.

In the present embodiment, the electric motor controller 2 determines a torsional compensation amount by multiplying the torsional angular velocity ωd of a drive shaft 8 by a first FB gain k1, and subtracts the torsional compensation amount from the desired torque command value Tmt* to calculate a first torque command value Tm1*. Further, the electric motor controller 2 determines a torsional compensation amount by multiplying the torsional angular velocity ωd of the drive shaft 8 by a second FB gain k2, and subtracts the torsional compensation amount from the desired torque command value Tmt* to calculate a second torque command value Tm2*.

In step S12, the electric motor controller 2 estimates, in the dead zone section estimator 20, a dead zone section of a driving force transmission system between an electric motor 4 and drive wheels 9a, 9b in a vehicle on the basis of the desired torque command value Tmt*. The electric motor controller 2 of the present embodiment calculates a torsional angle estimated value θd^ of the drive shaft 8 from the desired torque command value Tmt* by using the vehicle model 22 that takes a gear backlash into account, and outputs the calculation result as a determination signal S for determining the dead zone section.

In step S13, the electric motor controller 2 determines whether a reduction gear 5 is in the dead zone section.

The electric motor controller 2 of the present embodiment determines, in a torque switcher 36, that the reduction gear 5 is in the dead zone section if the torsional angle estimated value θd^ is zero, or determines that the reduction gear 5 is not in the dead zone section if the torsional angle estimated value θd^ is non-zero.

In steps S14 to S17, the electric motor controller 2 limits a second torque command value Tm2* in a torque limiter 35 if the reduction gear 5 is in the dead zone section.

In step S14, if the reduction gear 5 is in the dead zone section, then the electric motor controller 2 determines whether the second torque command value Tm2* is greater than an upper limit value T max of the noise/vibration allowable range.

In step S18, if the second torque command value Tm2* is greater than the upper limit value T max of the noise/vibration allowable range, then the electric motor controller 2 outputs, as the final torque command value Tmf*, the upper limit value T max or the first torque command value Tm1*, whichever has a greater value.

In step S15, if the second torque command value Tm2* is equal to or below the upper limit value T max of the noise/vibration allowable range, then the electric motor controller 2 determines whether the second torque command value Tm2* is smaller than a lower limit value T min of the noise/vibration allowable range.

In step S17, if the second torque command value Tm2* is smaller than the lower limit value T min of the noise/vibration allowable range, then the electric motor controller 2 outputs, as the final torque command value Tmf*, the lower limit value T min or the first torque command value Tm1*, whichever has a smaller value.

In step S16, if the second torque command value Tm2* is equal to or below the upper limit value T max and is equal to or greater than the lower limit value T min, i.e. is within the noise/vibration allowable range, then the electric motor controller 2 outputs the second torque command value Tm2* as the final torque command value Tmf*.

In step S19, if the torsional angle estimated value θd^ is not zero, then the electric motor controller 2 determines that the reduction gear 5 is not in the dead zone section, and outputs the first torque command value Tm1* as the final torque command value Tmf*.

Then, if the processing of any one of steps S16 to S19 is finished, the series of processing procedure steps related to the vibration damping control arithmetic processing is finished.

Figure 14:
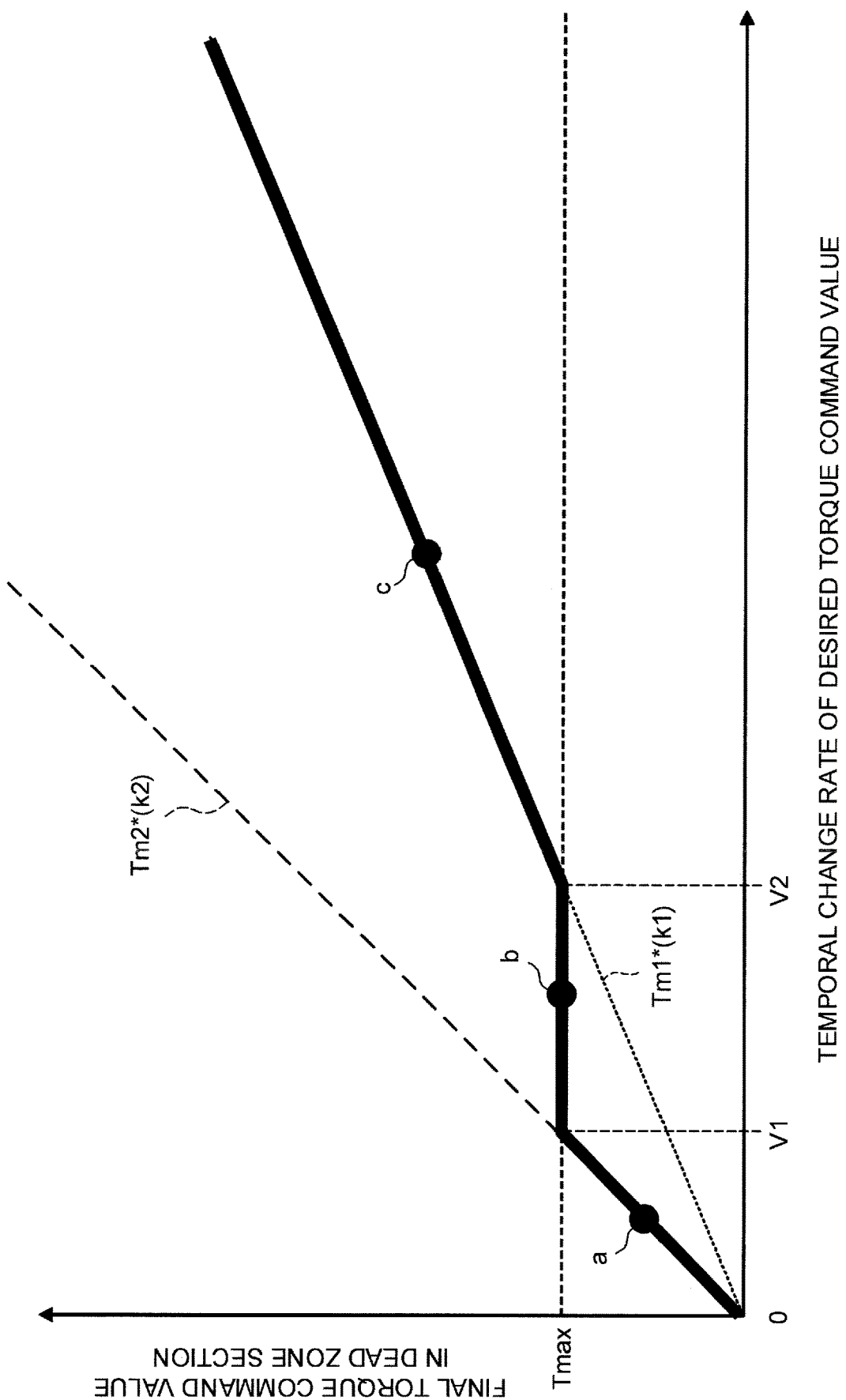
FIG. 14 is a diagram illustrating the relationship between the temporal change rate of a desired torque and the torque command value in a dead zone section in the present embodiment.

FIG. 14 is a conceptual diagram illustrating the relationship between the temporal change rate of the desired torque command value Tmt* and the final torque command value Tmf* in the dead zone section according to the present embodiment.

In FIG. 14, the first torque command value Tm1* is denoted by the dotted line, the second torque command value Tm2* is denoted by the dashed line, and the final torque command value Tmf* is denoted by the solid line.

In a low speed section in which the temporal change rate of the desired torque command value Tmt* is from zero to V1, the second torque command value Tm2* is set as the final torque command value Tmf* so as to secure the responsiveness of the vehicle in the dead zone section. In the low speed section, the final torque command value Tmf* increases as the temporal change rate of the desired torque command value Tmt* increases.

In a medium speed section in which the temporal change rate of the desired torque command value Tmt* is from V1 to V2, the final torque command value Tmf* is limited to the upper limit value T max of the noise/vibration allowable range by the torque limiter 35. This makes it possible to suppress the occurrence of a noise or a vibration attributable to a backlash while at the same time securing the responsiveness of the vehicle in the dead zone section.

In a high speed section in which the temporal change rate of the desired torque command value Tmt* is greater than V2, the first torque command value Tm1* becomes greater than the upper limit value T max. Hence, the first torque command value Tm1* is set as the final torque command value Tmf* by the max selector 38. This makes it possible to prevent the responsiveness of the vehicle from excessively decreasing while at the same time minimizing an increase in a noise or a vibration attributable to a backlash.

Figure 15:
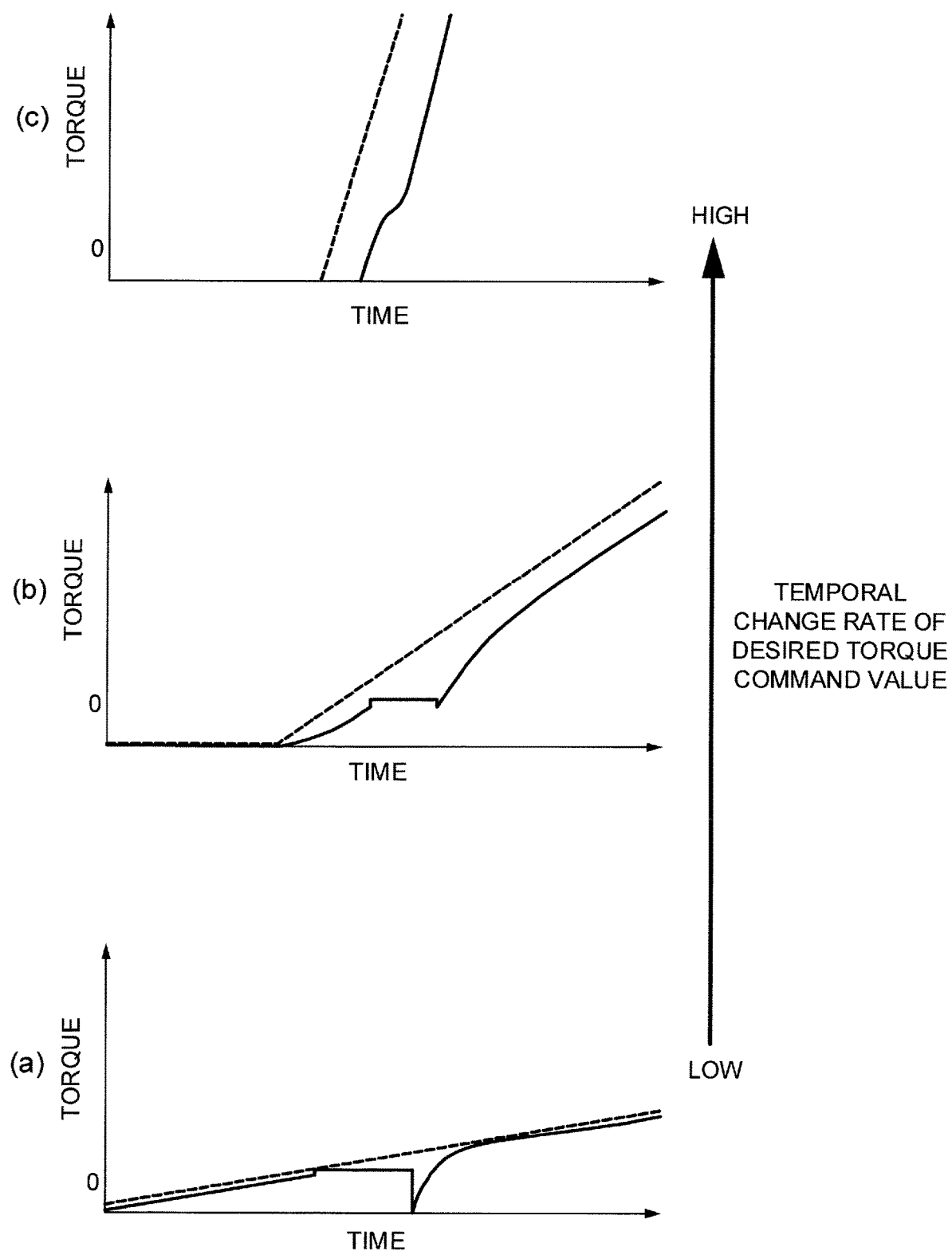
FIG. 15 presents time charts illustrating changes in the torque command value in the dead zone section for each temporal change rate of the desired torque.

FIG. 15 presents time charts illustrating the temporal changes of the final torque command value Tmf* at three points, a to c, illustrated in FIG. 14.

FIG. 15 (a) illustrates the temporal change of the final torque command value Tmf* at point a in the low speed section denoted by the solid line in FIG. 14, FIG. 15 (b) illustrates the temporal change of the final torque command value Tmf* at point b in the medium speed section, and FIG. 15(c) illustrates the temporal change of the final torque command value Tmf* at point c in the high speed section.

Each of FIGS. 15 (a) to (c) illustrates the final torque command value Tmf* by the solid line, and the desired torque command value Tmt* by the dashed line. The axes of abscissas of FIGS. 15 (a) to (c) are time axes common to each other.

As illustrated in FIG. 15 (a), the relative velocity between gears decreases in the low speed section, so that the second torque command value Tm2* is set, without being limited, as the final torque command value Tmf* when the reduction gear 5 enters the dead zone section. This causes the final torque command value Tmf* to slightly increase, approaching the desired torque command value Tmt*, so that the time for overpassing a backlash can be shortened.

As illustrated in FIG. 15 (b), the relative velocity between gears in the reduction gear 5 increases in the medium speed section, so that the second torque command value Tm2* becomes greater than the upper limit value T max of the noise/vibration allowable range. Therefore, the final torque command value Tmf* is limited to the upper limit value T max by the torque limiter 35, thus making it possible to suppress a noise or a vibration attributable to a gear backlash.

As illustrated in FIG. 15 (c), the high speed section is the case where a driver steps deeply on an accelerator pedal, so that the first torque command value Tm1* is set as the final torque command value Tmf* by the max selector 38 in order to give a priority to securing the acceleration of the vehicle in this section.

Thus, by setting the first torque command value Tm1*, which is smaller than the second torque command value Tm2*, as the final torque command value Tmf*, the ease of operation for the driver can be secured while at the same time suppressing an increase in the noise or vibration attributable to the collision of gears.

As described above, either the first torque command value Tm1* or an output value of the torque limiter 35, whichever is greater, is set as the final torque command value Tmf*, thus making it possible to properly assign a priority to suppressing a noise or a vibration attributable to a backlash or to securing the ease of operation for the driver according to the temporal change rate of the desired torque command value Tmt*. Therefore, the occurrence of the sense of stagnation or a noise in the dead zone section can be avoided without causing discomfort to the driver, thus leading to improved ride comfort of the driver.

According to the second embodiment of the present invention, the electric motor controller 2 calculates the first torque command value Tm1* by multiplying the torsional angular velocity $\omega d$ of the drive shaft 8 by the first feedback gain k1 in the case where it is estimated that the vehicle is not in the dead zone section. Further, the electric motor controller 2 calculates the second torque command value Tm2* by multiplying the torsional angular velocity $\omega d$ by the second feedback gain k2, which is smaller than the first feedback gain k1, in the case where it is estimated that the vehicle is in the dead zone section.

Further, in steps S14 to S18, the electric motor controller 2 sets, as the final torque command value Tmf*, either a value obtained by limiting the second torque command value Tm2* to a predetermined noise/vibration allowable range, or the first torque command value Tmf*, whichever value is greater.

Thus, as illustrated in FIG. 14, the final torque command value Tmf* increases with respect to the limit value of the noise/vibration allowable range as the change rate of the desired torque command value Tmt* increases, so that a higher priority can be given to securing the responsiveness of the vehicle than to suppressing a noise or a vibration attributable to a backlash.

Third Embodiment

Figure 16:
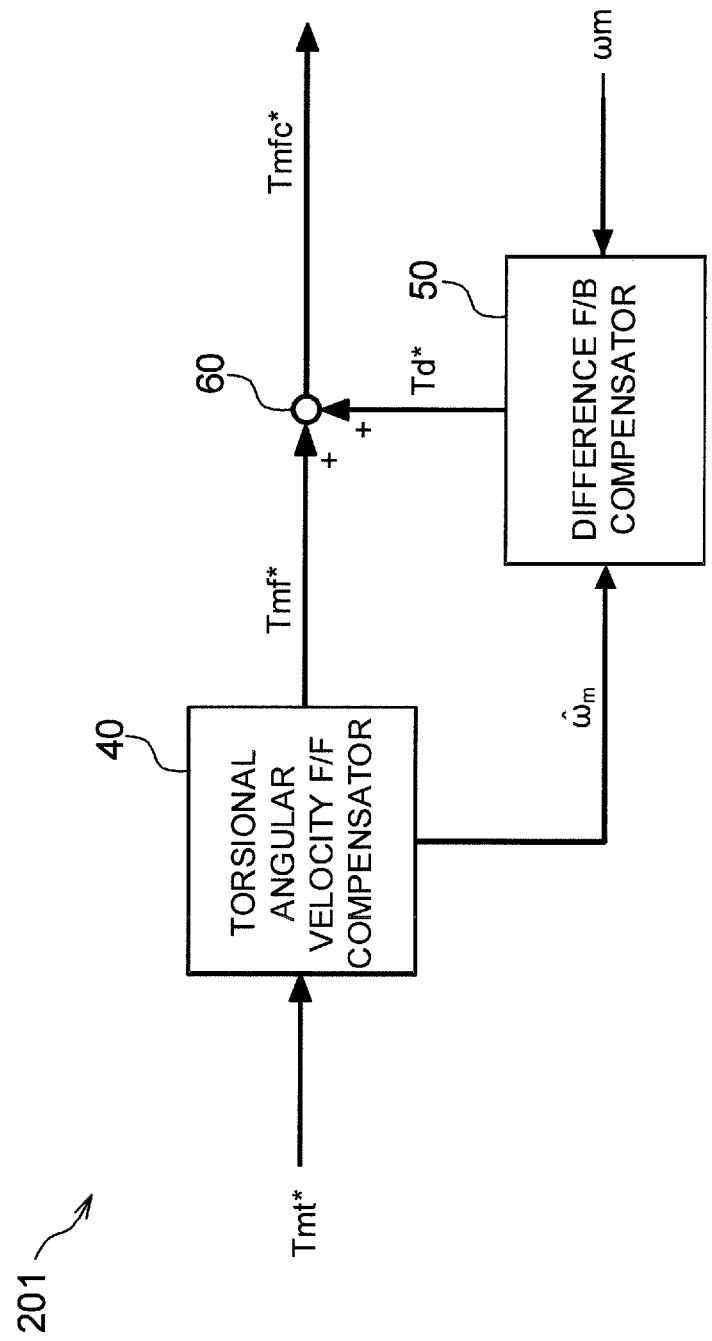
FIG. 16 is a block diagram illustrating an example of the functional configuration of a control device in a third embodiment of the present invention.

FIG. 16 is a block diagram illustrating an example of the functional configuration of a vibration damping control calculator 201 in a third embodiment of the present invention.

The vibration damping control calculator 201 corresponds to the vibration damping control calculator 200 in the first embodiment. The vibration damping control calculator 201 is provided with a torsional angular velocity F/F compensator 40, a difference F/B compensator 50, and an adder 60.

The torsional angular velocity F/F compensator 40 receives the desired torque command value Tmt* and outputs the final torque command value Tmf* and a motor rotational angular velocity estimated value $\omega m\hat{}$ with respect to the final torque command value Tmf*.

The difference F/B compensator 50 receives the motor rotational angular velocity estimated value $\omega m\hat{}$ and a motor rotational angular velocity detection value $\omega m$, and outputs a difference torque compensation amount Td* for compensating for the torsion of the drive shaft 8.

The adder 60 corrects the final torque command value Tmf* on the basis of the final torque command value Tmf* output from the torsional angular velocity F/F compensator 40 and the difference torque compensation amount Td* output from the difference F/B compensator 50. In the present embodiment, the adder 60 adds the final torque command value Tmf* and the difference torque compensation amount Td*, and outputs a corrected final torque command value Tmfc*.

Figure 17:
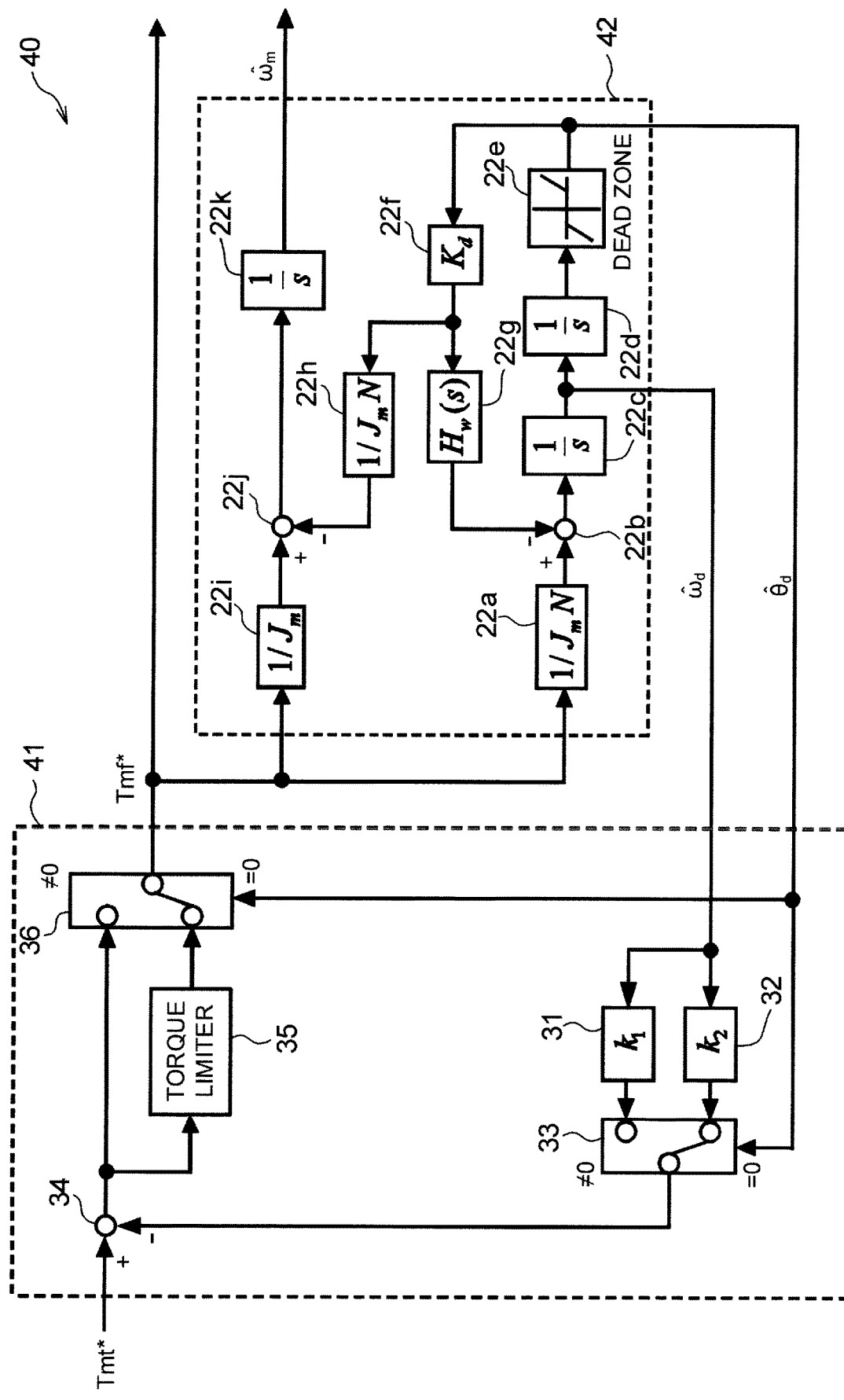
FIG. 17 is a block diagram illustrating an example of a torsional angular velocity F/F compensator that carries out feedforward calculation of a motor torque command value and the estimated value of a motor rotational angular velocity on the basis of a desired torque of a motor.

FIG. 17 is a block diagram illustrating the detailed configuration of the torsional angular velocity F/F compensator 40. The torsional angular velocity F/F compensator 40 is provided with a torsional angular velocity F/B calculator 41 and a vehicle model 42.

The vehicle model 42 is composed of vehicle parameters and a dead zone model simulating a gear backlash. The vehicle model 42 receives the final torque command value Tmf* and outputs a torsional angular velocity estimated value $\omega d\hat{}$ of the drive shaft 8 and a motor rotational angular velocity estimated value $\omega m\hat{}$. The vehicle model 42 applies expressions (1) to (29). Expression (38) is applied to the backlash characteristic from the electric motor 4 to the drive shaft 8.

The torsional angular velocity F/B calculator 41 has the same configuration as that of the torsional angular velocity F/B calculator 41 illustrated in FIG. 6. The torsional angular velocity F/B calculator 41 calculates the final torque command value Tmf* by using a desired torque command value Tmt* and the torsional angular velocity estimated value ωd^.

More specifically, the desired torque command value Tmt* and the torsional angular velocity estimated value ωd^ are input to the torsional angular velocity F/B calculator 41. If the torsional angle estimated value θd^ of the drive shaft 8 is non-zero, i.e. if a reduction gear 5 is in a section other than the dead zone section, then the torsional angular velocity F/B calculator 41 calculates the final torque command value Tmf* by subtracting a value, which is obtained by multiplying the torsional angular velocity estimated value ωd^ of the drive shaft 8 by a first FB gain k1, from the desired torque command value Tmt*.

On the other hand, if the torsional angle estimated value θd^ is zero, i.e. if the reduction gear 5 is in the dead zone section, then the torsional angular velocity F/B calculator 41 calculates the final torque command value Tmf* by subtracting a value, which is obtained by multiplying the torsional angular velocity estimated value ωd^ by a second FB gain k2, from the desired torque command value Tmt*. Further, the torsional angular velocity F/B calculator 41 limits the final torque command value Tmf* by an upper limit value and a lower limit value of a noise/vibration allowable range in the dead zone section.

The first FB gain k1 is calculated according to expression (36) and the second FB gain k2 is calculated according to expression (37).

Figure 18:
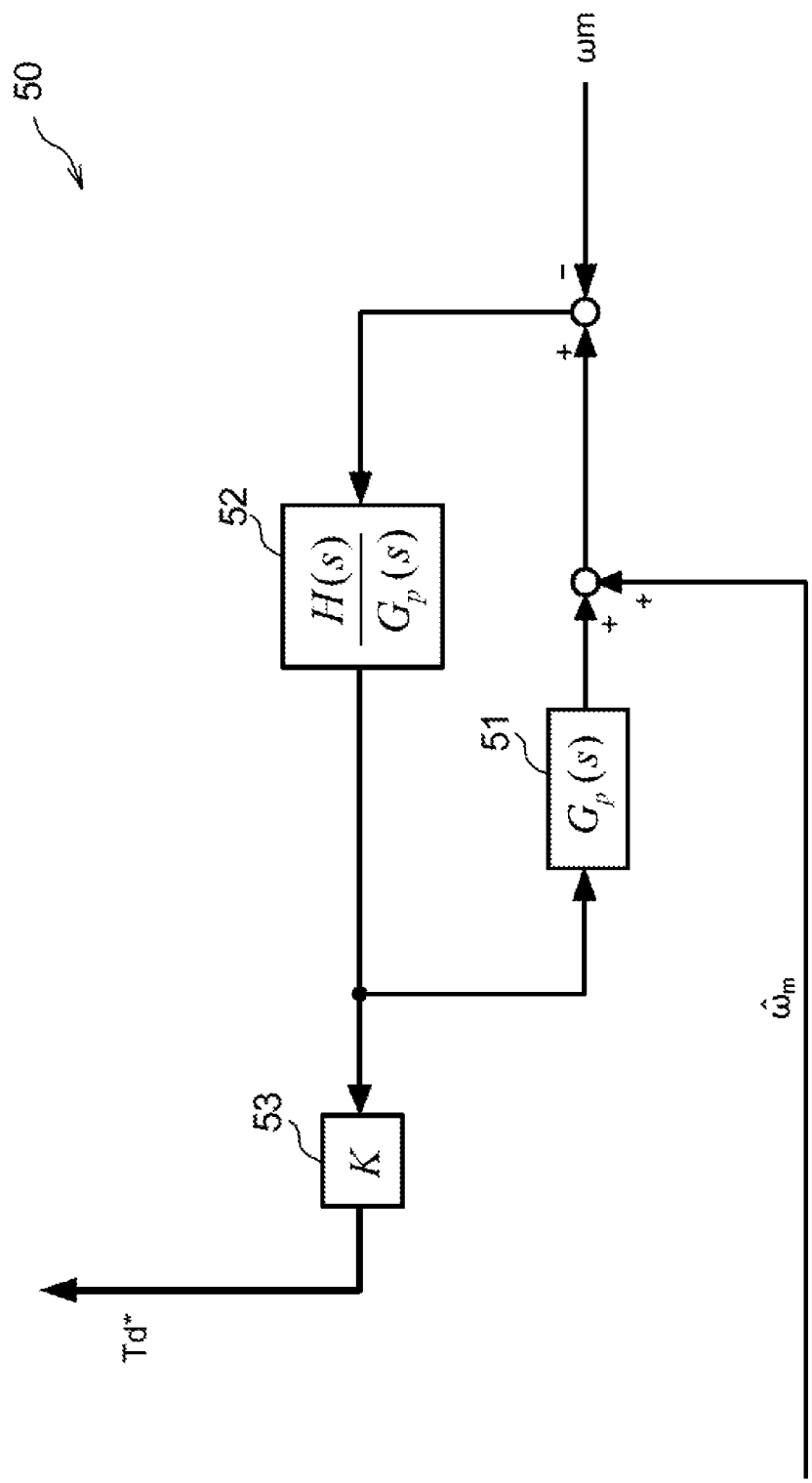
FIG. 18 is a block diagram illustrating an example of a difference F/B compensator that compensates for the torque of the motor on the basis of an estimated value and a detection value of a motor rotational angular velocity and a difference therebetween.

FIG. 18 is a block diagram illustrating the detailed configuration of the difference F/B compensator 50.

The difference F/B compensator 50 is provided with a calculating section 51, which estimates the motor rotation angle with respect to a difference torque compensation amount Td*, a processing section 52 which constitutes a filter, and a gain multiplier 53.

The calculating section 51 receives the difference torque compensation amount Td* and outputs the motor rotation angle estimated value by using a transmission characteristic Gp(s) to be controlled. Expression (8) is applied to the transmission characteristic Gp(s) to be controlled.

The processing section 52 consists of a filter (H(s)/Gp(s)) composed of the inverse characteristic of the transmission characteristic Gp(s) and a bandpass filter H(s). The bandpass filter H(s) is set such that the attenuation characteristics on the low-pass side and the high-pass side substantially coincide with each other and the torsional resonance frequency of a drive system lies in the vicinity of the center of passband on a logarithmic axis (log scale).

For example, when the bandpass filter H(s) is configured by a primary high-pass filter and a primary low-pass filter, the bandpass filter H(s) is denoted by expressions (39) to (43) given below.

[MATH19]

$$H(s) = \frac{\tau_H s}{(1 + \tau_H s) \cdot (1 + \tau_L s)} \tag{39}$$

$$\tau_L = \frac{1}{2\pi f_{HC}} \tag{40}$$

$$f_{HC} = k \cdot f_p \tag{41}$$

$$\tau_H = \frac{1}{2\pi f_{LC}} \tag{42}$$

$$f_{LC} = f_p / k \tag{43}$$

Coefficient k in expressions (41) and (43) takes any value, and frequency fp denotes the torsional resonance frequency of a driving force transmission system.

The gain multiplier 53 is disposed to adjust the stability margins (a gain margin and a phase margin) of the control system of the F/B system. The gain K set in the gain multiplier 53 takes a value having a magnitude of 1 or less.

Thus, the difference F/B compensator 50 adds the motor rotational angular velocity estimated value ωm^ with respect to the final torque command value Tmf* calculated by the vehicle model 42 and the motor rotation angle estimated value with respect to the difference torque compensation amount Td* to determine a final motor rotational angular velocity estimated value. Then, the difference F/B compensator 50 calculates the difference torque compensation amount Td* by passing the difference between the determined final motor rotation angular velocity estimated value and a motor rotational angular velocity detection value ωm through the processing section 52.

Although it is desirable to provide the difference F/B compensator 50 as a constituent of the control device of the vehicle, the motor torque can be also controlled on the basis of the final torque command value Tmf* output from a torsional angular velocity F/F compensator 40 without providing the difference F/B compensator 50. Further, the difference F/B compensator 50 may be configured to calculate the difference torque compensation amount Td* by multiplying the difference between the torsional angular velocity estimated value ωd^ and the torsional angular velocity detection value ωd by a predetermined gain.

As described above, the electric motor controller 2 of the present embodiment can suppress a noise, which is produced when gears mesh with each other, by limiting the absolute value of the final torque command value Tmf* to a predetermined value in the dead zone section.

Figure 19:
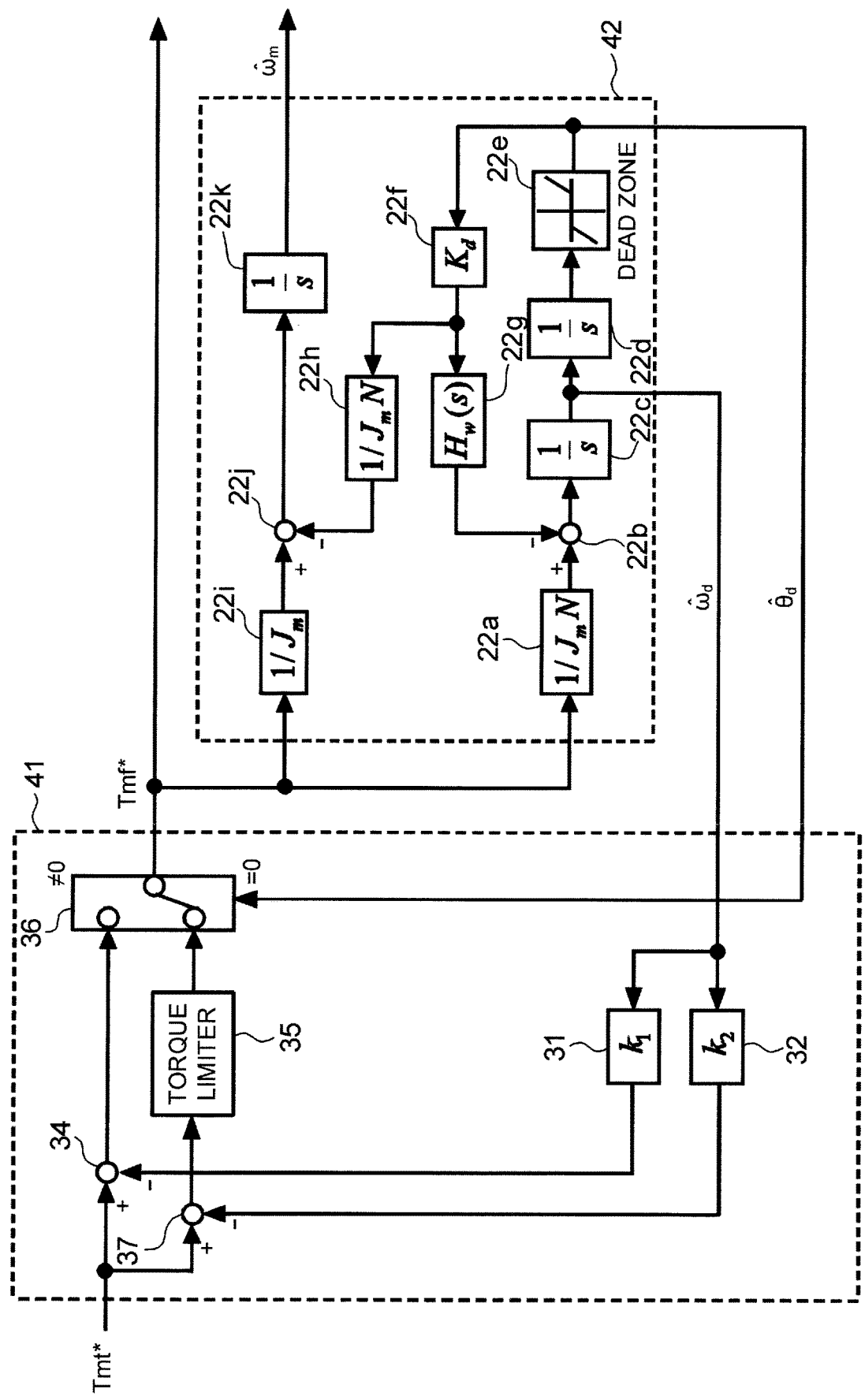
FIG. 19 is a block diagram illustrating another example of the torsional angular velocity F/F compensator in the present embodiment.

FIG. 19 is a diagram illustrating another example of the functional configuration of the torsional angular velocity F/F compensator 40 in the present embodiment. A torsional angular velocity F/B calculator 41 illustrated in FIG. 19 has the same configuration as that of the torsional angular velocity F/B calculator illustrated in FIG. 10. This configuration is also capable of providing the same operation and effect.

According to the third embodiment of the present invention, the electric motor controller 2 receives the desired torque command value Tmt* and outputs the torsional angular velocity estimated value ωd^ used to calculate the rotational angular velocity estimated value ωm^ and the final torque command value Tmf* of the electric motor 4 by using the vehicle model 42 simulating the response characteristics of the vehicle.

Further, the electric motor controller 2 calculates the final torque command value Tmf* by subtracting the value, which is obtained by multiplying the torsional angular velocity estimated value ωd^ of the drive shaft 8 by the second FB gain k2, from the desired torque command value Tmt*. The electric motor controller 2 limits the final torque command value Tmf* to a predetermined noise/vibration allowable range in the dead zone section, and corrects the final torque command value Tmf* by feedback control based on the detection value ωm and the estimated value ωm^ of the rotational angular velocity of the electric motor 4.

As described above, the final torque command value Tmf* is determined by feedforward control using the vehicle model 42, thus making it possible to suppress noises when gears overpass backlashes, without impairing the stability of the feedback control system.

Further, according to the present embodiment, as illustrated in FIG. 17, the electric motor controller 2 calculates the torsional angle estimated value θd^ of the drive shaft 8 by using the vehicle model 42, and determines whether the vehicle is in the dead zone section according to the magnitude of the torsional angle estimated value θd^.

Thus, the torsional angle estimated value θd^ of the drive shaft 8 can be determined by using the vehicle model 42, which outputs the rotational angular velocity estimated value ωm^ of the electric motor 4, so that an overlap of arithmetic processing can be avoided and the processing load on the electric motor controller 2 can be reduced.

The above has described the embodiments of the present invention. However, the foregoing embodiments are merely some examples to which the present invention has been applied, and are not intended to limit the technical scope of the present invention to the specific configurations of the foregoing embodiments.

In the foregoing embodiments, the descriptions have been given of the vehicles adapted to set the accelerator position toward zero to increase the regenerative braking force of the electric motor 4, thereby decelerating the vehicle. However, the present invention can be applied also to a vehicle adapted to decelerate by making use of the regenerative braking force of the electric motor 4 by a driver depressing a brake pedal.

The foregoing embodiments can be combined as appropriate.

The invention claimed is:

1. A vehicle control method for decelerating by the regenerative braking of a motor connected to a drive shaft of a drive wheel, comprising:
    a calculation step of calculating a torque command value for suppressing a vibration component of the drive shaft by feeding back a torsional angular velocity of the drive shaft to a desired torque that determines the power of the motor;
    an estimation step of estimating a dead zone section, in which the torque of the motor in the vehicle is not transmitted to the drive shaft, on the basis of the desired torque;
    a limitation step of limiting the torque command value in the case where the vehicle is estimated to be in the dead zone section; and
    a control step of controlling the operation of the motor on the basis of the torque command value.

2. The vehicle control method according to claim 1, wherein
    in the calculation step,
    the torque command value is calculated by subtracting a value, which is obtained by multiplying the torsional angular velocity by a feedback gain, from the desired torque, and
    in the limitation step, the feedback gain is decreased to increase the responsiveness of the motor in the case where the vehicle is estimated to be in the dead zone section.

3. The vehicle control method according to claim 2, wherein
    in the calculation step,
    in the case where the vehicle has been estimated to be not in the dead zone section, the torsional angular velocity is multiplied by a first feedback gain thereby to calculate a first torque command value,
    in the case where the vehicle has been estimated to be in the dead zone section, the torsional angular velocity is multiplied by a second feedback gain, which is smaller than the first feedback gain, thereby to calculate a second torque command value, and
    in the control step, a value obtained by limiting the second torque command value to a predetermined range in the limitation step or the first torque command value, whichever value is greater, is set as the torque command value.

4. The vehicle control method according to claim 1, comprising:
    a detection step of detecting the rotational angular velocity of the motor;
    a processing step of receiving the torque command value and outputting an estimated value of the rotational angular velocity of the motor and an estimated value of the torsional angular velocity used in the calculation step by using a vehicle model simulating a response characteristic of the vehicle; and
    a correction step of correcting the torque command value on the basis of the rotational angular velocity of the motor and the estimated value of the rotational angular velocity.

5. The vehicle control method according to claim 4, wherein
    in the estimation step,
    an estimated value of the torsional angle of the drive shaft is calculated using the vehicle model, and whether the vehicle is in the dead zone section is determined according to the estimated value.

6. A vehicle control device for decelerating by the regenerative braking of a motor connected to a drive shaft of a drive wheel, comprising:
    a calculation unit which calculates a torque command value for suppressing a vibration component of the drive shaft by feeding back a torsional angular velocity of the drive shaft to a desired torque that determines the power of the motor;
    a control unit which controls the operation of the motor on the basis of the torque command value;
    an estimation unit which estimates a dead zone section, in which the torque of the motor in the vehicle is not transmitted to the drive shaft, on the basis of the desired torque; and
    a limiting unit which limits the torque command value in the case where the vehicle is in the dead zone section.

* * * * *